US011172192B2

United States Patent
Lu et al.

(10) Patent No.: US 11,172,192 B2
(45) Date of Patent: Nov. 9, 2021

(54) IDENTIFYING DEFECTS IN OPTICAL DETECTOR SYSTEMS BASED ON EXTENT OF STRAY LIGHT

(71) Applicant: Waymo LLC, Mountain View, CA (US)

(72) Inventors: Chen David Lu, Campbell, CA (US); Matthew Rinehart, San Mateo, CA (US); Volker Grabe, Redwood City, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 16/377,527

(22) Filed: Apr. 8, 2019

(65) Prior Publication Data

US 2020/0213581 A1 Jul. 2, 2020

Related U.S. Application Data

(60) Provisional application No. 62/785,375, filed on Dec. 27, 2018.

(51) Int. Cl.
*H04N 5/235* (2006.01)
*H04N 17/00* (2006.01)
(Continued)

(52) U.S. Cl.
CPC ......... *H04N 17/002* (2013.01); *G06T 7/0002* (2013.01); *G06T 7/70* (2017.01);
(Continued)

(58) Field of Classification Search
CPC ...... H04N 17/002; H04N 5/2351; G06T 7/40; G06T 7/0002
See application file for complete search history.

(56) References Cited

U.S. PATENT DOCUMENTS 3,776,638 A  12/1973 Teter
4,110,046 A  8/1978 Baker et al.
(Continued)

FOREIGN PATENT DOCUMENTS

CN  106534841 B  *  4/2018
JP  2009168504 A  *  7/2009
(Continued)

OTHER PUBLICATIONS

"What Do the Sun and the Sky Tell Us About the Camera?"; Jean-Francois Lalonde, et al.; Sep. 23, 2011.
(Continued)

*Primary Examiner* — Jonathan R Messmore
(74) *Attorney, Agent, or Firm* — McDonnell Boehnen Hulbert & Berghoff LLP

(57) ABSTRACT

Example embodiments relate to identifying defects in optical detector systems based on extent of stray light. An example embodiment includes a method. The method includes capturing, using an optical detector system, an image of a scene that includes a bright object. The method also includes determining a location of the bright object within the image. Further, the method includes determining, based on the location of the bright object within the image, an extent of stray light from the bright object that is represented in the image. In addition, the method includes determining, by comparing the extent of stray light from the bright object that is represented in the image to a predetermined threshold extent of stray light, whether one or more defects are present within the optical detector system. The predetermined threshold extent of stray light corresponds to an expected extent of stray light.

20 Claims, 16 Drawing Sheets

(51) Int. Cl.
*G06T 7/70* (2017.01)
*G06T 7/00* (2017.01)
(52) U.S. Cl.
CPC . *H04N 5/2351* (2013.01); *G06T 2207/30168* (2013.01); *G06T 2207/30252* (2013.01)

(56) References Cited

U.S. PATENT DOCUMENTS

| | | | |
|---|---|---|---|
| 4,397,554 | A | 8/1983 | Genco et al. |
| 6,302,545 | B1 | 10/2001 | Schofield et al. |
| 7,425,076 | B2 | 9/2008 | Schofield et al. |
| 7,543,946 | B2 | 6/2009 | Ockerse et al. |
| 7,702,236 | B2* | 4/2010 | Steinberg ............... G06T 7/0008 348/180 |
| 2006/0038381 | A1* | 2/2006 | Gehring ................. B60D 1/36 280/477 |
| 2007/0279618 | A1 | 12/2007 | Sano et al. |
| 2010/0135594 | A1 | 6/2010 | Allebach et al. |
| 2012/0206050 | A1* | 8/2012 | Spero ..................... H05B 3/008 315/152 |
| 2014/0184671 | A1* | 7/2014 | Lee ......................... G09G 3/006 345/697 |
| 2014/0321701 | A1* | 10/2014 | Halimeh ............... B60S 1/0844 382/103 |
| 2015/0085250 | A1* | 3/2015 | Larsen .................... A61B 3/14 351/206 |
| 2017/0150070 | A1 | 5/2017 | Johansson et al. |
| 2017/0180659 | A1* | 6/2017 | Levoy ................... H04N 5/2178 |
| 2017/0195605 | A1* | 7/2017 | Alves .................... G06K 9/4661 |
| 2018/0003945 | A1 | 1/2018 | Namiki |
| 2018/0121639 | A1* | 5/2018 | Liu ....................... G06K 9/00597 |
| 2019/0080454 | A1* | 3/2019 | Hameed .................. G01B 11/30 |
| 2019/0096057 | A1* | 3/2019 | Allen ...................... H04N 7/188 |
| 2019/0174056 | A1* | 6/2019 | Jung ..................... H04N 1/00244 |
| 2019/0186931 | A1* | 6/2019 | Dittmer .............. G01C 21/3461 |
| 2019/0310349 | A1* | 10/2019 | Wilmer ................... G01S 17/42 |

FOREIGN PATENT DOCUMENTS

| | | |
|---|---|---|
| WO | 2006060683 A2 | 6/2006 |
| WO | 2011093767 A1 | 8/2011 |

OTHER PUBLICATIONS

"What Does the Sky Tell Us About the Camera?"; Jean-Francois Lalonde, et al.; European Conference on Computer Vision; 2008.
"Removal of Glare Caused by Water Droplets"; Takenori Hara, et al.; 2009 Conference for Visual Media Production 2009.
"Detection Probabilities: Performance Prediction for Sensors of Autonomous Vehicles"; Marc Geese, et al.; IS&T International Symposium on Electronic Imaging 2018; Autonomous Vehicles and Machines Conference 2018; Jan. 28, 2018-Feb. 1, 2018.
"Sun-induced Veiling Glare in Dusty Camera Optics"; Carl Christian Liebe, et al.; Opt. Eng. 43(2) 493-499; Feb. 2004.
International Searching Authority, International Search Report and Written Opinion dated Apr. 29, 2020, issued in connection with International Patent Application No. PCT/US2019/067058, filed Dec. 18, 2019, 9 pages.

* cited by examiner

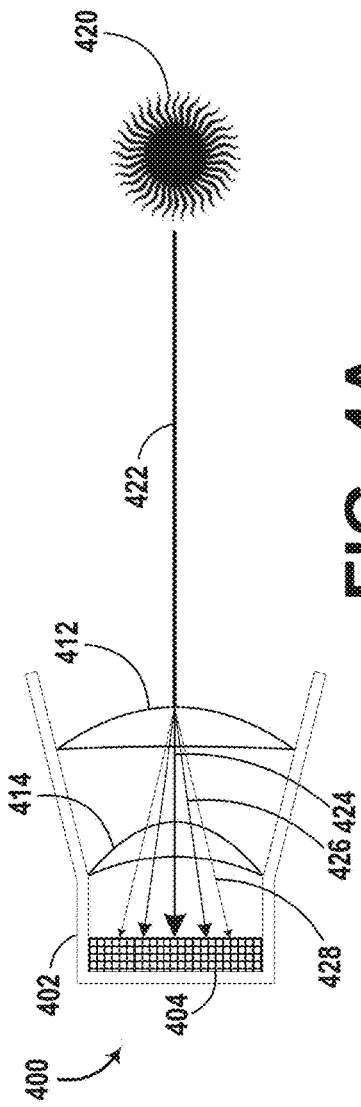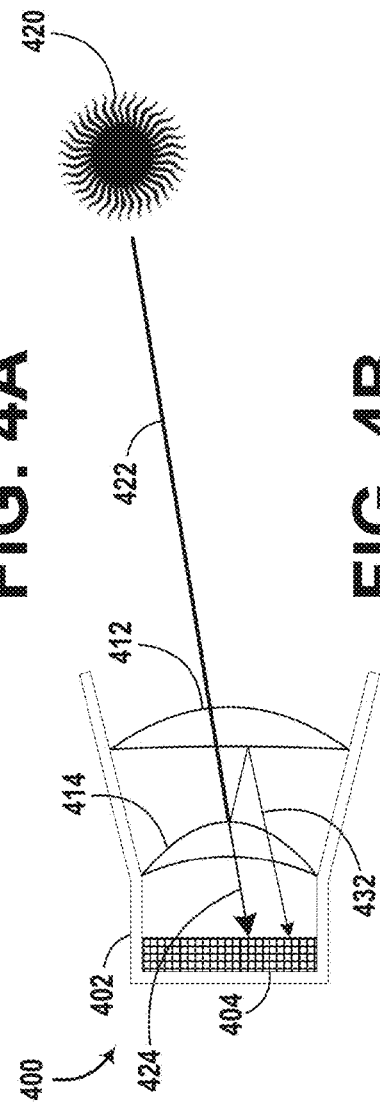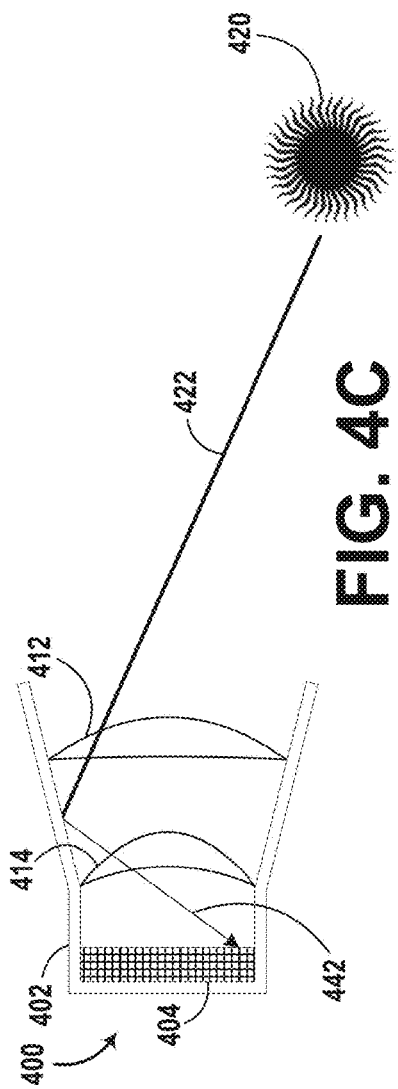

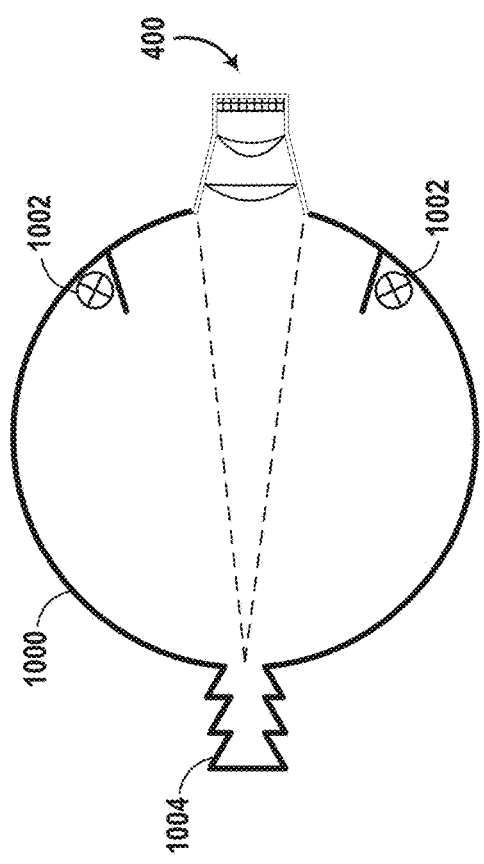
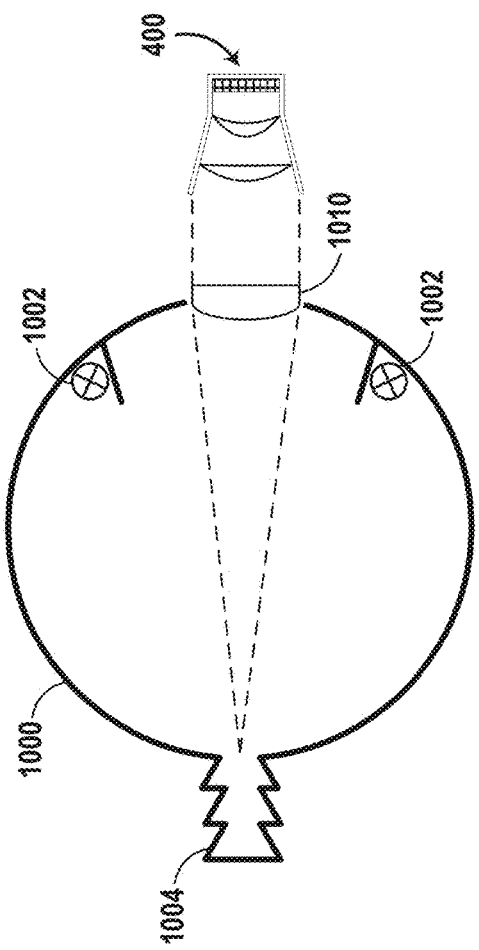

IDENTIFYING DEFECTS IN OPTICAL DETECTOR SYSTEMS BASED ON EXTENT OF STRAY LIGHT

CROSS-REFERENCE TO RELATED APPLICATIONS

The present application is a non-provisional application claiming priority to provisional U.S. Application No. 62/785,375, filed Dec. 27, 2018, the contents of which are hereby incorporated by reference in their entirety.

BACKGROUND

Unless otherwise indicated herein, the materials described in this section are not prior art to the claims in this application and are not admitted to be prior art by inclusion in this section.

Cameras and image sensors are devices used to capture images of a scene. Some cameras (e.g., film cameras) chemically capture an image on film. Other cameras (e.g., digital cameras) electrically capture image data (e.g., using a charge-coupled device (CCD) or complementary metal-oxide-semiconductor (CMOS) sensors). Images captured by cameras can be analyzed to determine their contents. For example, a processor may execute a machine-learning algorithm in order to identify objects in a scene based on a library of previously classified objects that includes objects' shapes, colors, sizes, etc. (e.g., such a machine-learning algorithm can be applied in computer vision in robotics or other applications).

Cameras can have a variety of features that can distinguish one camera from another. For example, cameras and/or images captured by cameras may be identified by values such as aperture size, f-number, exposure time, shutter speed, depth of field, focal length, International Organization for Standardization (ISO) sensitivity (or gain), pixel size, sensor resolution, exposure distance, etc. These features may be based on the lens, the image sensor, and/or additional facets of the camera. Further, these features may also be adjustable within a single camera (e.g., the aperture of a lens on a camera can be adjusted between photographs).

Further, as a result of imperfections of optics within a camera, aberrations within captured images can be generated. For example, misalignment, non-unity transmittance, internal reflections, debris, etc. may cause light from a scene to be directed to unintended/improper regions of an image sensor. Such extraneous light may appear as veiling glare or lens flare within a captured image.

SUMMARY

Embodiments described herein may include systems and methods for detecting defects within cameras. Defects in camera imaging optics (e.g., lenses or mirrors) can include cracks, smudges, deformations, or debris on the optics. Such defects can be inherent within the optics as a result of fabrication/assembly or can develop over time (e.g., as a result of using the camera). Further, defects can lead to aberrations or errors in captured images. Hence, it can be useful to identify such defects. The embodiments described herein may detect such defects by monitoring an amount of stray light (e.g., veiling glare) within images captured by the camera, as stray light may provide an indication of the presence of/severity of/type of defects within camera optics.

In one aspect, a method is provided. The method includes capturing, using an optical detector system, an image of a scene that includes a bright object. The method also includes determining a location of the bright object within the image. Further, the method includes determining, based on the location of the bright object within the image, an extent of stray light from the bright object that is represented in the image. In addition, the method includes determining, by comparing the extent of stray light from the bright object that is represented in the image to a predetermined threshold extent of stray light, whether one or more defects are present within the optical detector system. The predetermined threshold extent of stray light corresponds to an expected extent of stray light.

In another aspect, a non-transitory, computer-readable medium having instructions stored thereon is provided. The instructions, when executed by a processor, cause the processor to execute a method. The method includes receiving an image of a scene that includes a bright object. The image was captured using an optical detector system. The method also includes determining a location of the bright object within the image. Further, the method includes determining, based on the location of the bright object within the image, an extent of stray light from the bright object that is represented in the image. In addition, the method includes determining, by comparing the extent of stray light from the bright object that is represented in the image to a predetermined threshold extent of stray light, whether one or more defects are present within the optical detector system. The predetermined threshold extent of stray light corresponds to an expected extent of stray light.

In an additional aspect, an optical detector system is provided. The optical detector system includes an imaging optic. The optical detector system also includes an image sensor configured to receive light from a scene via the imaging optic. Further, the optical detector system includes a controller configured to perform a monitoring routine. The monitoring routine includes capturing, using an optical detector system, an image of a scene that includes a bright object. The monitoring routine also includes determining a location of the bright object within the image. Further, the monitoring routine includes determining, based on the location of the bright object within the image, an extent of stray light from the bright object that is represented in the image. In addition, the monitoring routine includes determining, by comparing the extent of stray light from the bright object that is represented in the image to a predetermined threshold extent of stray light, whether one or more defects are present within the optical detector system. The predetermined threshold extent of stray light corresponds to an expected extent of stray light.

These as well as other aspects, advantages, and alternatives will become apparent to those of ordinary skill in the art by reading the following detailed description, with reference, where appropriate, to the accompanying drawings.

BRIEF DESCRIPTION OF THE DRAWINGS

FIG. 4A is an illustration of a mechanism that gives rise to veiling glare within an optical detector system, according to example embodiments.

FIG. 4B is an illustration of a mechanism that gives rise to veiling glare within an optical detector system, according to example embodiments.

FIG. 4C is an illustration of a mechanism that gives rise to veiling glare within an optical detector system, according to example embodiments.

FIG. 10A is an illustration of an integrating sphere used to measure a baseline amount of stray light for an optical detector system, according to example embodiments.

FIG. 10B is an illustration of an integrating sphere with an integrated collimating lens used to measure a baseline amount of stray light for an optical detector system, according to example embodiments.

DETAILED DESCRIPTION

Figure 1:
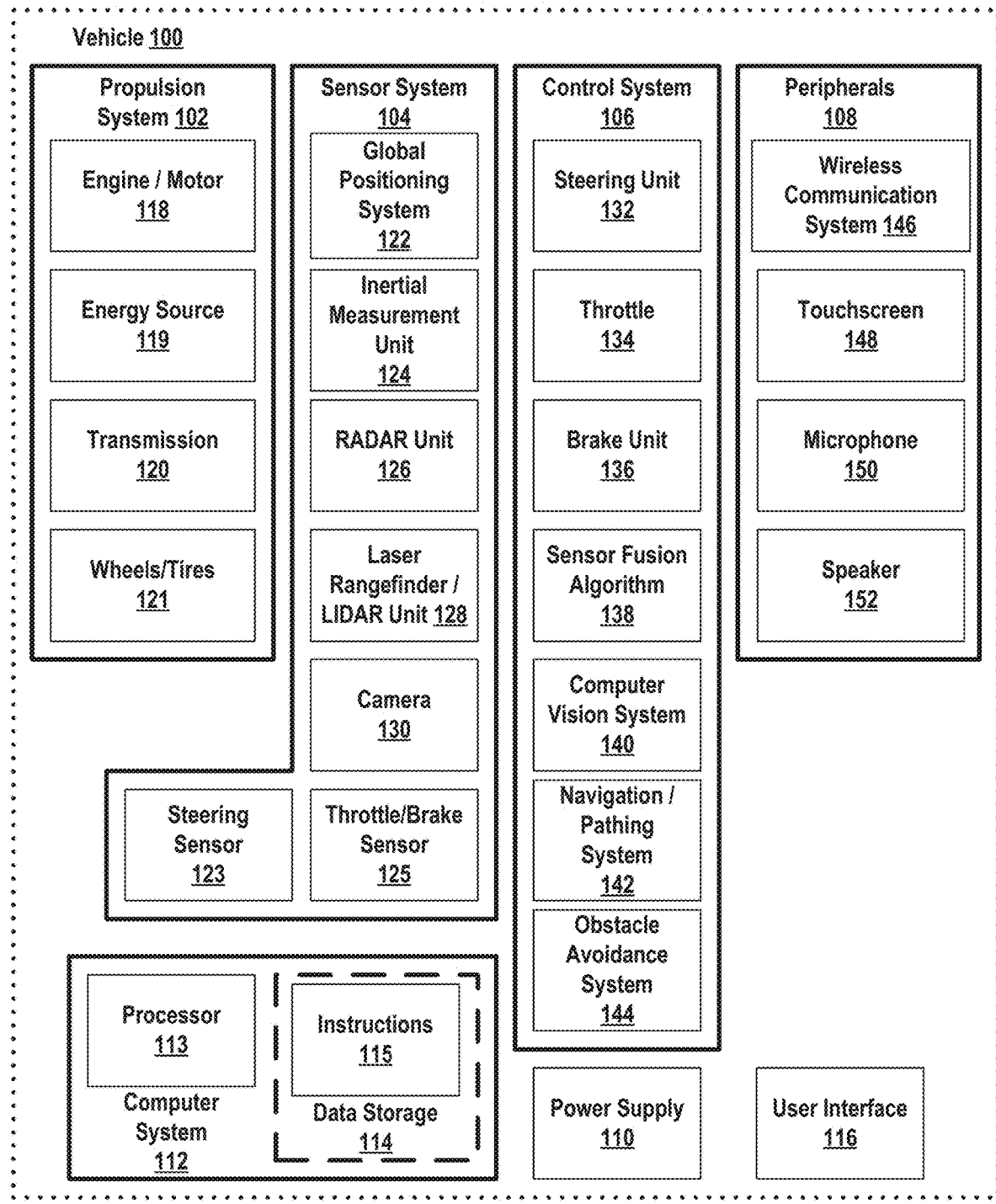
FIG. 1 is a functional block diagram illustrating a vehicle, according to example embodiments.

Example methods and systems are contemplated herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. Further, some of the illustrated elements may be combined or omitted. Yet further, an example embodiment may include elements that are not illustrated in the figures.

I. OVERVIEW

Optical detector systems (e.g., cameras) include multiple components used to capture images. For example, some cameras may include an image sensor, a shutter, an aperture, a lens, one or more mirrors, one or more filters, etc. Such components may be occluded by debris, damaged, misaligned, etc. during fabrication, during assembly, or in the course of normal use. If one or more such issues are present within the camera, images captured by the camera might not accurately reflect the surrounding scene (e.g., if a primary lens of the camera is damaged or occluded by debris, certain subjects of the scene may not be visible in an image captured by the camera or if a lens is misaligned with respect to the image sensor or if the aperture is improperly sized, the focus/depth of focus may be such that one or more subjects within the scene are not properly in focus).

Example embodiments disclosed herein may be capable of identifying issues with camera components by analyzing images captured using the camera. This can be beneficial by rendering human evaluation of the camera/its components/its images unnecessary while still ensuring that accurate images are being captured by the camera. For example, if the camera is used for object detection and avoidance in a vehicle operating in an autonomous or semi-autonomous mode, having the ability to identify when a camera should be decommissioned, repaired, or replaced based on images captured by the camera can reduce cost and improve safety. Images captured by the camera may be transmitted to a remote server and analyzed by the server. In this way, a series of cameras (e.g., within a fleet of vehicles operating in an autonomous mode) may be simultaneously monitored by the server.

As described herein, some embodiments may include capturing an image of a bright object using the camera and then analyzing the image (e.g., by a processor executing instructions stored within a non-transitory, computer-readable medium) to determine if any defects are present within the camera (e.g., within the optics of the camera). Determining whether any defects are present may include determining an extent of stray light present within the image captured by the camera. The stray light may correspond to diffuse veiling glare present within the image, for example. Such diffuse veiling glare may serve as an indication that one or more of the optics within the camera is amiss (e.g., a lens has debris or condensation on it or a mirror is cracked, dirty, or misaligned). Further, the amount of and position of stray light within the image may indicate which type of issues are present within the camera. For example, if streaks or stripes of glare are present within an image, it may be determined that a windshield wiper has left water in a streaked, striped, or smeared pattern on an exterior lens or optical window. Alternatively, if one small portion of an image has a high intensity (e.g., has a large pixel brightness), and that portion is positioned far from a bright source (e.g., the sun) within the image, it may be determined that there is a crack in a mirror, optical window, lens, or other housing surface at the corresponding location.

Monitoring a camera as described above (i.e., by capturing an image using the camera and then analyzing the captured image to identify defects) may be performed at repeated intervals (e.g., every month, every day, every hour, every 30 minutes, every 20 minutes, every 10 minutes, every 5 minutes, every minute, every 30 seconds, every 20 seconds, every 10 seconds, every 5 seconds, every second, every 500 ms, every 250 ms, every 100 ms, every 50 ms, etc.) to ensure that the images captured by the camera accurately reflect the scene surrounding the camera.

If it is determined that one or more defects are present within the camera, appropriate action may then be taken in response. Appropriate action may include cleaning, repairing, recalibrating, replacing, or decommissioning the camera. Additionally or alternatively, appropriate action may include performing image analysis to alter images captured by the camera so as to mitigate errors caused by the one or more defects. For example, if an intensity of one region of images captured by a camera is artificially inflated based on one or more defects in camera optics, each image captured by that camera going forward may be modified by reducing the intensity of the corresponding region of the captured images.

II. EXAMPLE SYSTEMS

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. In some embodiments, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112, data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, laser rangefinder/LIDAR 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, brake wear).

GPS 122 may include a transceiver operable to provide information regarding the position of vehicle 100 with respect to Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

Figure 2:
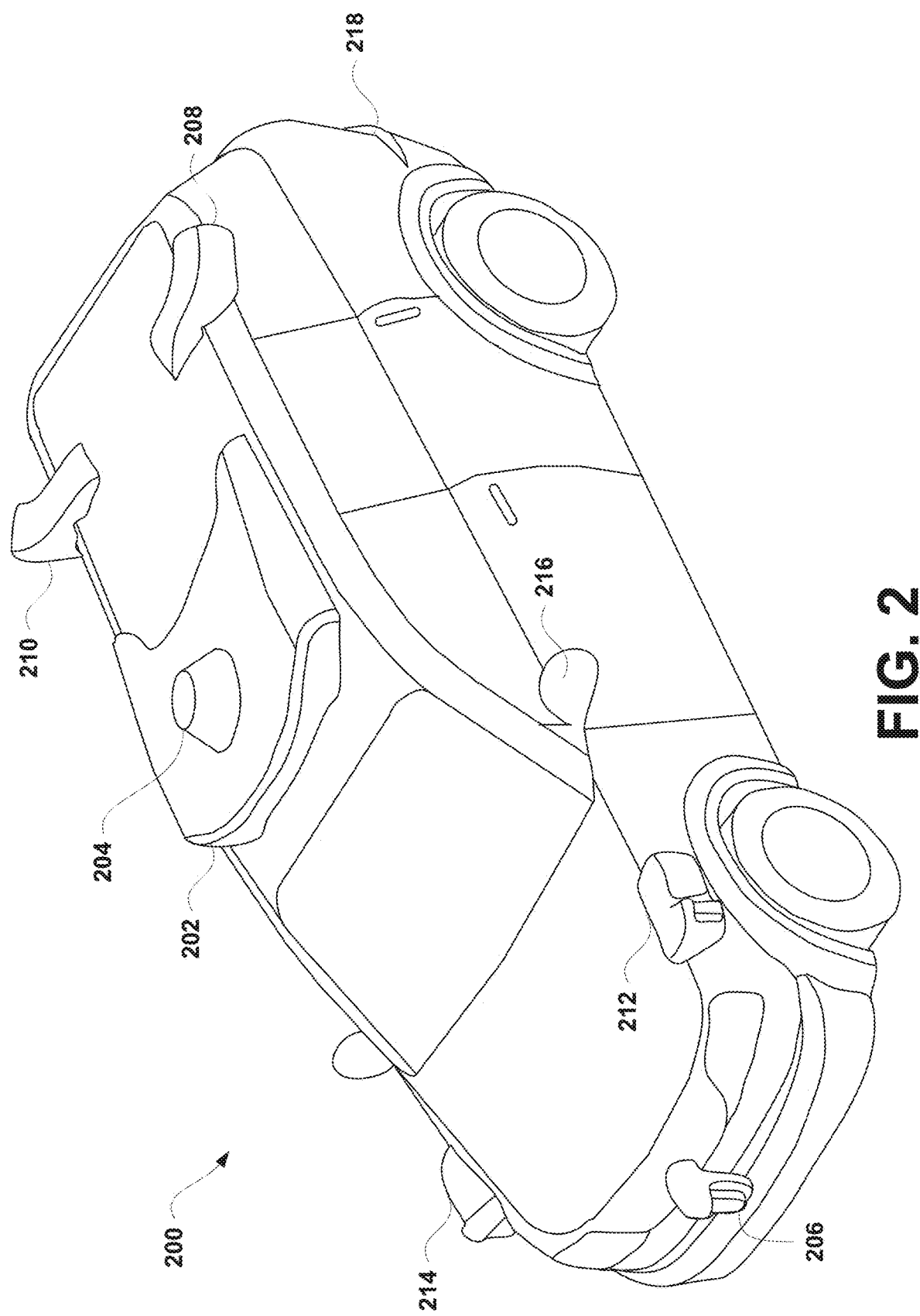
FIG. 2 is an illustration of a physical configuration of a vehicle, according to example embodiments.

FIG. 2 shows an example vehicle 200 that can include some or all of the functions described in connection with vehicle 100 in reference to FIG. 1. Although vehicle 200 is illustrated in FIG. 2 as a van for illustrative purposes, the present disclosure is not so limited. For instance, the vehicle 200 can represent a truck, a car, a semi-trailer truck, a motorcycle, a golf cart, an off-road vehicle, a farm vehicle, etc.

The example vehicle 200 includes a sensor unit 202, a first LIDAR unit 204, a second LIDAR unit 206, a first radar unit 208, a second radar unit 210, a first LIDAR/radar unit 212, a second LIDAR/radar unit 214, and two additional locations 216, 218 at which a radar unit, LIDAR unit, laser rangefinder unit, and/or other type of sensor or sensor(s) could be located on the vehicle 200. Each of the first LIDAR/radar unit 212 and the second LIDAR/radar unit 214 can take the form of a LIDAR unit, a radar unit, or both.

Furthermore, the example vehicle 200 can include any of the components described in connection with vehicle 100 of FIG. 1. The first and second radar units 208, 210 and/or the first and second LIDAR units 204, 206 can actively scan the surrounding environment for the presence of potential obstacles and can be similar to the radar unit 126 and/or laser rangefinder/LIDAR unit 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, radars, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be movable in a scanning fashion within a particular range of angles and/or azimuths. The sensor unit 202 could be mounted atop the roof of a car, although other mounting locations are possible. Additionally, the sensors of sensor unit 202 could be distributed in different locations and need not be collocated in a single location. Some possible sensor types and mounting locations include the two additional locations 216, 218. Furthermore, each sensor of sensor unit 202 can be configured to be moved or scanned independently of other sensors of sensor unit 202. In an example configuration, one or more radar scanners (e.g., first and second radar units 208, 210) can be located near the rear of the vehicle 200, to actively scan the environment near the back of the vehicle 200 for the presence of radio-reflective objects. Similarly, the first LIDAR/radar unit 212 and the second LIDAR/radar unit 214 may be mounted near the front of the vehicle 200 to actively scan the environment near the front of the vehicle 200. A radar scanner can be situated, for example, in a location suitable to illuminate a region including a forward-moving path of the vehicle 200 without occlusion by other features of the vehicle 200. For example, a radar scanner can be embedded in and/or mounted in or near the front bumper, front headlights, cowl, and/or hood, etc. Furthermore, one or more additional radar scanning devices can be located to actively scan the side and/or rear of the vehicle 200 for the presence of radio-reflective objects, such as by including such devices in or near the rear bumper, side panels, rocker panels, and/or undercarriage, etc.

Although not shown in FIG. 2, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include dedicated short-range communications (DSRC), radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which the vehicle 200 illuminates an object in the environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
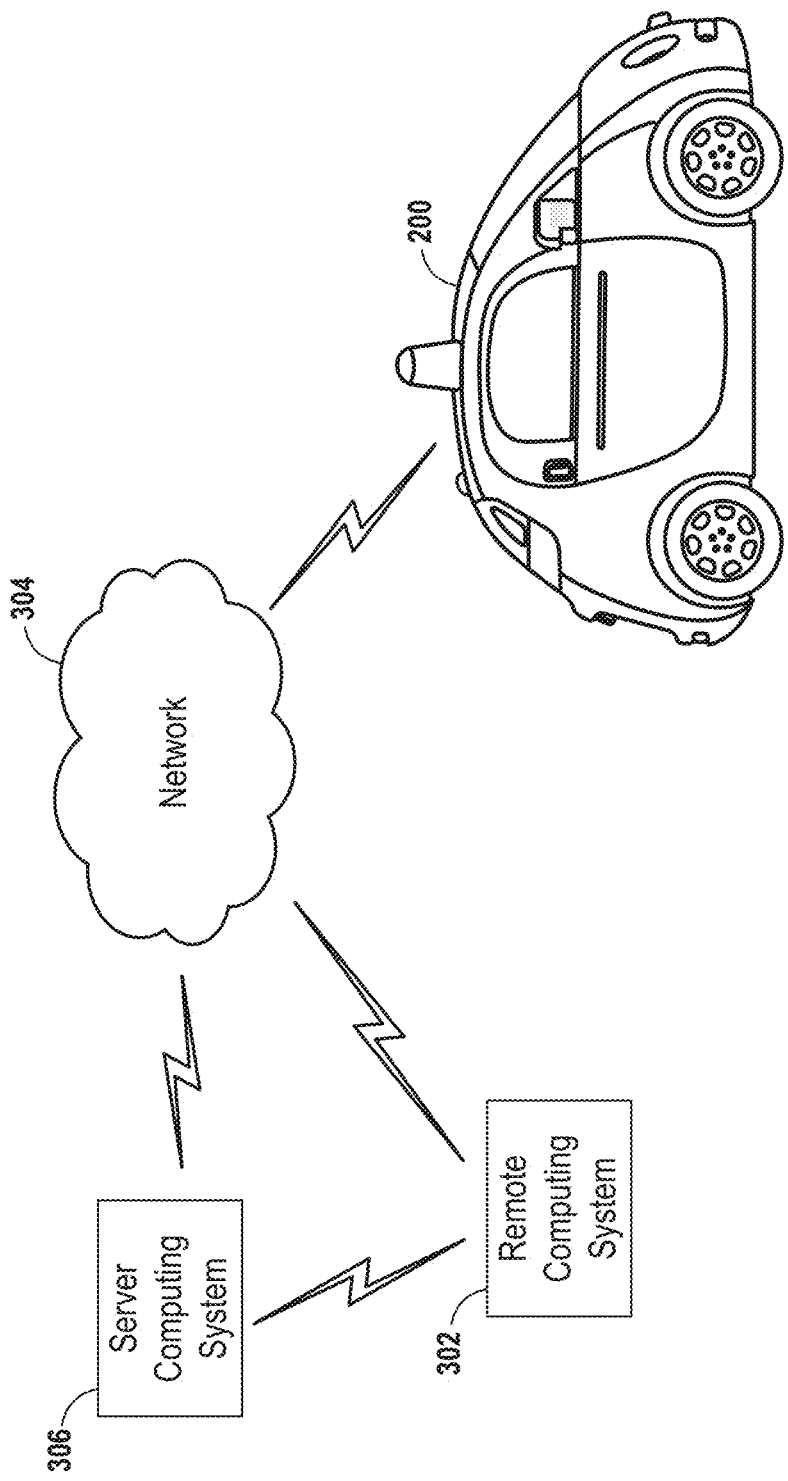
FIG. 3 is a conceptual illustration of wireless communication between various computing systems related to an autonomous vehicle, according to example embodiments.

FIG. 3 is a conceptual illustration of wireless communication between various computing systems related to an autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous mode that enables a control system to safely navigate vehicle 200 between destinations using sensor measurements. When operating in an autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the environment of an autonomous vehicle. In general, at least one computing system will be able to analyze the images and possibly control the autonomous vehicle.

In some embodiments, to facilitate autonomous operation a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distances to and positions of various reflecting objects may be determined. In some embodiments, the vehicle may have more than one radar in different orientations. The radar system may be configured to store captured information to a memory for later processing by a processing system of the vehicle. The information captured by the radar system may be environment data.

In another example, a laser range finder may be configured to transmit an electromagnetic signal (e.g., infrared light, such as that from a gas or diode laser, or other possible light source) that will be reflected by target objects near the vehicle. The laser range finder may be able to capture the reflected electromagnetic (e.g., laser) signals. The captured reflected electromagnetic signals may enable the range-finding system (or processing system) to determine a range to various objects. The laser range finder may also be able to determine a velocity or speed of target objects and store it as environment data.

Additionally, in an example, a microphone may be configured to capture audio of environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the environment of the vehicle. For example, the processing system may combine data from both radar information and a captured image to determine if another vehicle or pedestrian is in front of the autonomous vehicle. In other embodiments, other combinations of sensor data may be used by the processing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the environment to determine at least one object having a detection confidence below a threshold. A processor in the vehicle may be configured to detect various objects of the environment based on environment data from various sensors. For example, in one embodiment, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In some embodiments, the environment data may come from a camera and be image or video data. In other embodiments, the environment data may come from a LIDAR unit. The vehicle may analyze the captured image or video data to identify objects in the image or video data. The methods and apparatuses may be configured to monitor image and/or video data for the presence of objects of the environment. In other embodiments, the environment data may be radar, audio, or other data. The vehicle may be configured to identify objects of the environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the environment, it may also calculate a confidence associated with the specific detected object. The confidence may be calculated in various ways depending on the embodiment. In one example, when detecting objects of the environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

FIG. 4A illustrates an optical detector system 400. The optical detector system 400 may be a component of a camera (e.g., the camera 130 shown and described with reference to FIG. 1). In some embodiments, the optical detector system 400 may be used to capture images of an environment surrounding a vehicle (e.g., the vehicle 200 illustrated in FIG. 2). Such images may be captured for object detection and avoidance, for detection of optical defects within one or more components of a detection system (e.g., to detect one or more cracks within a dome or optical window), or for both object detection and avoidance and detection of optical defects. As illustrated, the optical detector system 400 may include a body 402, an image sensor 404, a first lens 412, and a second lens 414.

The body 402 may provide a rigid housing for the rest of the components of the optical detector system 400. Further, the rest of the components in the optical detector system 400 may be attached to the housing so as to provide a proper alignment and relative position of the remaining components. For example, the first lens 412 and the second lens 414 may be attached to a lens-barrel portion of the body 402 such that the first lens 412 and the second lens 414 are separated by a predetermined distance and such that the first lens 412 and the second lens 414 are properly aligned with one another and the image sensor 404. Additionally, in some embodiments, the inner surface of the body 402 may be made of and/or coated with an anti-reflective material (e.g., blackened steel) to mitigate internal reflections. In addition to or instead of using an anti-reflective material on an inner surface of the body 402, in some embodiments, the first lens 412 and/or the second lens 414 may be coated with an anti-reflective material to mitigate internal reflections.

FIGS. 4A-4C are provided as examples. It is understood that in alternate embodiments contemplated herein, the optical detector system 400 may include greater or fewer lenses (e.g., three lenses, four lenses, five lenses, etc.), lenses with different orientations, lenses of different styles (e.g., as opposed to the plano-convex first lens 412 and the convex second lens 414 illustrated), different separations of lenses, or lenses with different focal lengths. Further, it is understood that, in some embodiments, the optical detector system 400 may include additional or alternative imaging optics. For example, the optical detector system 400 may include one or more mirrors, one or more apertures, one or more optical filters, etc. In some embodiments, the optical detector system 400 may include an adjustable focus arrangement (e.g., a set of lenses that may be translated with respect to one another adjust an associated focal point). Such adjustable focus arrangements may be manually adjusted or adjusted in an automated fashion (e.g., by a controller configured to reorient/translate stages on which each of the lenses is mounted; the controller may adjust the focus of the lens arrangement based on the quality of a captured image).

The image sensor 404 may be configured to capture an image of the environment surrounding the optical detector system 400 (i.e., the scene) by intercepting light signals from the environment via the first lens 412 and the second lens 414. The image sensor 404 may include various light detectors or detector arrays to enable the detection of such light signals. For example, in various embodiments, the image sensor 404 may include an array of single photon avalanche detectors (SPADs), an array of avalanche photodiodes (APDs), one or more silicon photomultipliers (SiPMs), an array of photodiodes, an array of phototransistors, an array of active pixel sensors (APSs), one or more CCDs, one or more cryogenic detectors, etc. In some embodiments, the optical detector system 400 may also include or be connected to a memory (e.g., a non-transitory, computer-readable medium, such as a hard drive) configured to store (e.g., as a series of digital bits in a pixel by pixel arrangement) images captured by the image sensor 404.

Optical detector systems, such as the optical detector system 400 illustrated in FIG. 4A, can be susceptible to internal reflections. For example, imperfections (e.g., impurities, cracks, air bubbles, scratches, dirt, dust, bug splatters, degradation of lens coatings, condensation, debris, imperfect transparency, etc.) within or on one of the lenses can lead to additional light signals (i.e., stray light signals) intersecting the image sensor 404 based on a single primary light signal. As illustrated in FIG. 4A, a primary light signal 422 may be transmitted by an object 420 (e.g., a bright object, such as the sun, that has high intensity relative to the other objects in the scene) in the surrounding environment of the optical detector system 400. Upon entering the optical detector system 400 and interacting with the first lens 412, for example, the primary light signal 422 may split into a reduced-intensity primary light signal 424, secondary light signals 426, and tertiary light signals 428. The reduced-intensity primary light signal 424, the secondary light signals 426, and the tertiary light signals 428 may be different intensities from one another.

In other embodiments, the primary light signal 422 may separate into greater or fewer additional light signals upon interacting with the first lens 412. Additionally or alternatively, any light signals generated based on the interaction of the primary light signal 422 with the first lens 412 may further generate additional light signals based on interactions with additional lenses in the optical detector system 400 (e.g., in some embodiments, the secondary light signals 426 or the tertiary light signals 428 may each further split into multiple light signals based on their interactions with the second lens 414). It is understood that the angles of the secondary light signals 426 and the tertiary light signals 428 relative to the reduced-intensity primary light signal 424 and the primary light signal 422 are illustrated only as examples. In other embodiments, the relative angles of the secondary light signals 426 or the tertiary light signals 428 may be different (e.g., based on the wavelength(s) of the primary light signal 422, the material composition of the first lens 412, the respective defects in the first lens 412, the ambient temperature, the ambient air pressure, the lens shape of the first lens 412, etc.).

As a result of the additional light signals (e.g., the secondary light signals 426 and the tertiary light signals 428) generated by the interaction of the primary light signal 422 with the first lens 412, an image captured by the image sensor 404 of the surrounding environment may be distorted and/or imprecise. In some embodiments, the object 420 may appear to be a different shape, size, and/or intensity than it otherwise would as a result of such imperfections in the optical detector system 400. For example, a veiling glare or lens flare (both forms of stray light) may be present in an image of the object 420 captured by the image sensor 404, thereby obscuring the object 420 within the captured image or obscuring other portions of the captured image. This may prevent observation of relatively faint objects that are positioned close to bright objects within the captured image (e.g., a pedestrian standing in front of the sun relative to the optical detector system 400 may be washed out by the sun, particularly if the veiling glare generated in the optical detector system 400 by the sun is severe). Further, such veiling glare or lens flare can adversely affect an ability of the image sensor 404 to capture images with a high dynamic range.

Other optical mechanisms can give rise to images captured by the image sensor 404 that do not precisely reflect the surrounding scene (e.g., can give rise to veiling glare or lens flare). For example, primary light signals 422 from objects 420 may be reflected from the incident face of one or more of the lens. For instance, as illustrated in FIG. 4B, the primary light signal 422 may be reflected by the front face of the second lens 414 to generate a reflected light signal 432. The reflected light signal 432 may then reflect off of the back face of the first lens 412, be transmitted through the second lens 414, and then intersect with the image sensor 404, as illustrated. As with the mechanism illustrated in FIG. 4A, the mechanism illustrated in FIG. 4B could result in veiling glare or lens flare that obscures objects within images captured by the image sensor 404 or causes the source object 420 to have an inaccurate intensity, shape, or size. It is understood that the angle of the reflected light signal 432 relative to the reduced-intensity primary light signal 424 and the primary light signal 422 are illustrated only as an example. In other embodiments, the relative angle of the reflected light signal 432 may be different (e.g., based on the wavelength(s) of the primary light signal 422, the material composition of the second lens 414, the respective defects in the second lens 414, the ambient temperature, the ambient air pressure, the lens shape of the second lens 414, the position of the object 420 relative to the optical detector system 400, etc.). Further, in some embodiments, there may be multiple reflected light signals generated based on the primary light signal 422.

Another optical mechanism that can give rise to stray light in captured images is illustrated in FIG. 4C. As illustrated, the primary light signal 422 may be reflected off of an interior surface of the body 402 (e.g., a lens-barrel portion of the body 402) to generate a reflected light signal 442. Also as illustrated, in some embodiments, the primary light signal 422 may be partially reflected by the interior surface of the body 402 and partially absorbed by the interior surface of the body 402, resulting in a reflected light signal 442 that has a reduced intensity compared with the primary signal 422. After being generated, the reflected light signal 442 may then be transmitted to the image sensor 404. As with the mechanisms illustrated in FIGS. 4A and 4B, the mechanism illustrated in FIG. 4C could obscure objects within images captured by the image sensor 404. Further, the mechanism illustrated in FIG. 4C could lead to light from objects that would otherwise not be captured to be captured by the image sensor 404 (i.e., objects outside of a field of view of the optical detector system 400 may produce light that is nonetheless captured by the image sensor 404). It is understood that the angle of the reflected light signal 442 relative to the primary light signal 422 is illustrated only as an example. In other embodiments, the relative angle of the reflected light signal 442 may be different (e.g., based on the wavelength(s) of the primary light signal 422, the material composition of the inner surface of the body 402, the material composition of a coating on the inner surface of the body 402, the ambient temperature, the ambient air pressure, the position of the object 420 relative to the optical detector system 400, the shape of a lens-barrel portion of the body 402, etc.). Further, in some embodiments, there may be multiple reflected light signals generated based on the primary light signal 422.

Figure 5:
FIG. 5 is an image of a scene that includes a bright object, according to example embodiments.

Based on the mechanisms described above and illustrated in FIGS. 4A-4C, stray light can be generated within the optical detector system 400 based on light signals generated by objects 420 within the environment surrounding the optical detector system 400. FIG. 5 illustrates an image captured by an image sensor 404 of an optical detector system 400 that has veiling glare and lens flare present (e.g., as a result of one or more of the mechanisms described with reference to FIGS. 4A-4C). Such an image may be referred to herein as a captured image 502 with glare. Other types of stray light (besides veiling glare and lens flare) are also possible based on optical imperfections within the optical detector system 400.

As a result of the generated glare, regions of the captured image 502 may have locations of higher intensity than they otherwise would have without such glare. For example, the captured image 502 has high-intensity regions near the position of the sun within the captured image 502, as illustrated. As described herein, such glare may be used to identify/evaluate defects (e.g., optical imperfections) within the optical detector system 400. For example, the presence or absence of high-intensity regions within the captured image 502, the locations of high-intensity regions within the captured image 502, the shape of high-intensity regions within the captured image 502, and/or the intensity of high-intensity regions within the captured image 502 may be used to identify whether optical imperfections are present within the optical detector system 400. Further, such high-intensity regions within the captured image 502 may be used to determine the type(s) of optical imperfection(s) (e.g., debris on a lens, mirror, or image sensor; condensation on a lens, mirror, or image sensor; scratch on a lens, mirror, or image sensor; crack on a lens, mirror, or image sensor; warping of a lens, mirror, or image sensor; misalignment of a lens, mirror, or image sensor; etc.) present within the optical detector system 400 and/or the location(s) of optical imperfection(s) present within the optical detector system 400 (e.g., center of a lens or periphery of a lens). Then, based on the severity of any optical imperfection(s) identified, additional actions may be taken to rectify any optical imperfection(s) (e.g., a lens and/or mirror may be cleaned, replaced, or realigned; the entire optical detector system 400 may be decommissioned or replaced; or a post-processing step may be performed on the captured image 502 to mitigate the effects of the glare).

In some embodiments, the optical detector system 400 used to capture images upon which stray light evaluations are made may be an optical detector system 400 used for object detection and avoidance. For example, the captured images may be images that can be used to identify certain objects within a scene, but can also be used to identify one or more optical defects within one or more optics of the optical detector system 400 (e.g., a lens or a mirror) or one or more optics of a larger environmental detection system (e.g., a dome or casing surrounding the optical detector system 400 and an accompanying LIDAR device). In alternate embodiments, the optical detector system 400 may instead be installed solely for the purpose of detecting optical defects within one or more optics (e.g., optics shared by multiple detection devices in a larger environmental detection system). In other words, the optical detector system 400 may be a dedicated optical defect detector system. For example, the optical detector system 400 may be separate from a camera and a LIDAR device that are installed for the purpose of object detection and avoidance. In such embodiments, if the optical detector system 400 detects an optical defect in one or more optics based on an extent of stray light within the captured image, the optical detector system 400 may initiate a correction mechanism (e.g., a cleaning mechanism such as a windshield wiper or a notification mechanism such as providing a flag that a certain region of a certain optic is unclean, damaged, and/or unusable for imaging).

FIGS. 6-11 will be used to illustrate one method by which stray light within an image of a bright object can be evaluated to determine whether one or more defects (e.g., optical imperfections) are present within an optical detector system (e.g., the optical detector system 400 illustrated in FIGS. 4A-4C) used to capture the image of the bright object. It is understood that FIGS. 6-11 are provided solely as an example and that other embodiments are within the scope of this disclosure and the associated claims.

Further, the method described with reference to the following figures may be performed in various locations and by various devices. In some embodiments, the optical detector system 400 used to capture an image of the scene that is to be analyzed for stray light may include an associated processor (e.g., a controller, such as a microcontroller). Such a processor may be a processor associated solely with the optical detector system 400. In other embodiments, the processor may be a processor used to control multiple components of a larger system (e.g., a controller for a vehicle operating in an autonomous or semi-autonomous mode, such as the processor 113 of the computer system 112 shown and described with reference to FIG. 1). The associated processor may execute instructions stored within a memory (e.g., similar to the instructions 115 stored within the data storage 114 described above with reference to FIG. 1) to perform digital image analysis on the captured image to determine an extent of stray light within the captured image.

Alternatively, the optical detector system 400 may transmit the captured image to another device to evaluate the stray light within the captured image. For example, the optical detector system 400 may transmit the captured image to a mobile computing device (e.g., the remote computing system 302 shown and described with reference to FIG. 3) or a server computing device (e.g., the server computing system 306 shown and described with reference to FIG. 3). Such computing devices may be located remotely from the optical detector system 400. Hence, such computing devices may receive the captured image from the optical detector system 400 via a network (e.g., the network 304 shown and described with reference to FIG. 3). Upon receiving the captured image, such computing devices may store the images within a memory and/or evaluate the captured images to identify an extent of stray light within the images. Such evaluation may be performed by a processor (e.g., a central processing unit (CPU) within the computing device that executes instructions stored within a memory, similar to the instructions 115 stored within the data storage 114 described above with reference to FIG. 1).

Regardless of where the evaluation of the captured image takes place, a first step in an example method may include determining a location of a bright object, if any, within the image. A bright object may be defined as an object having threshold luminance value or an object within the image that has an intensity value (e.g., pixel brightness value) above a defined threshold intensity. Such thresholds may be predetermined and stored within a memory. Alternatively, such thresholds may be defined based on the captured image (e.g., based on the median pixel brightness value within the image or the average pixel brightness value within the image) and/or based on other factors (e.g., a threshold may be based on a weather forecast, such as when the forecast for a given region is cloudy or foggy and the bright object within the image is the sun, the moon, a traffic signal, a streetlight, etc.). In some embodiments, the thresholds may be set or modified by a user (e.g., by transmitting a threshold setting or modification command to the computing device performing the analysis on the captured image). Additionally or alternatively, such thresholds may be determined using a machine learning algorithm (e.g., by evaluating a set of labeled training data).

If it is determined that there is no bright object within the captured image (e.g., there is no region within the image having intensity greater than a threshold intensity value), the threshold may be adjusted until a bright object is identified. Alternatively, in various embodiments, if no bright object within the captured image is identified, the method may request a different image for image analysis, determine that no defects are present within the optical detector system 400 that captured the image, or provide an output (e.g., to a user or to the optical detector system 400) that the captured image cannot be used to identify potential defects within the optical detector system 400.

Figure 6:
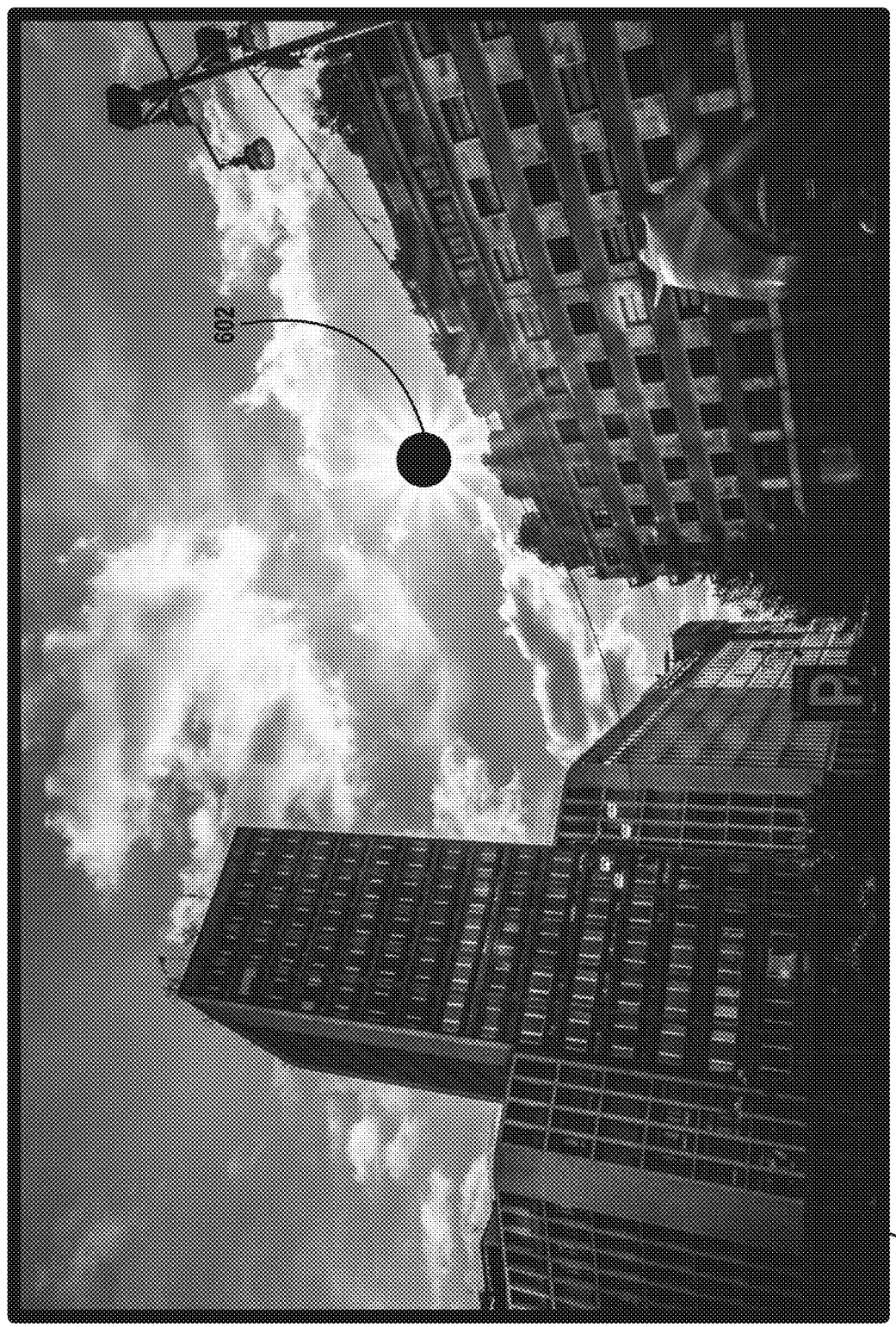
FIG. 6 is an image of a scene with an identified location of a bright object within the image, according to example embodiments.

Similar to FIG. 5, FIG. 6 is an illustration of the captured image 502 as captured by an optical detector system (e.g., the optical detector system 400 illustrated in FIGS. 4A-4C). However, unlike in FIG. 5, in FIG. 6 a bright object 602 has been labeled (e.g., as identified by a processor executing instructions stored within a non-transitory, computer-readable medium). In FIG. 6, the position of the bright object 602 within the captured image 502 has been labeled by a black circle. In some embodiments, as apparent based on FIG. 5, the bright object 602 may be the sun. As described below, the location of the bright object 602 within the captured image 502 can be used to determine the extent of stray light within the captured image 502. As such, the boundaries/edges of the bright object 602 may be identified such that regions of primary light coming from the bright object 602 within the captured image 502 can be separated from regions of stray light near the bright object 602 within the captured image 502. For example, any lens flare in the captured image 502 resulting from the bright object 602 that is outside of the region defining the position of the bright object 602 (e.g., the black circle in FIG. 6) may constitute stray light that can be analyzed to evaluate whether defects are present in the optical detector system 400.

There are multiple techniques by which the position of the bright object 602 within the captured image 502 can be determined. For example, the location of the bright object 602 within the captured image 502 may be determined based on a geographical location of the optical detector system 400, an orientation of the optical detector system 400, map data, previously captured images (e.g., labeled images), a time of day, and/or a calendar date. For example, if the bright object 602 is the sun, a computing device (e.g., a processor executing instructions stored in a memory) may determine the location of the bright object 602 relative to the optical detector system 400 used to capture the captured image 502 based on GPS coordinates of the optical detector system 400, an azimuthal angle and elevation angle of the optical detector system 400 (e.g., relative to the surface of the earth), a time of day, and/or a calendar date.

Thereafter, a determination of an extent of stray light in the captured image 502 can be made based on the location of the bright object 602. In embodiments where the bright object 602 is the sun, such a determination of the extent of stray light may be based on a predetermined angular size of the sun when observed from Earth. For example, the outer edges of the bright object 602 within the captured image 502 may be determined based on: (i) a center location of the bright object 602 (e.g., based on the geographical location of the optical detector system, an orientation of the optical detector system, a time of day, and the calendar date) and (ii) the diameter (e.g., angular diameter) of the sun when viewed from Earth's surface (e.g., about 32 arcminutes or about 0.53 degrees).

Figure 7:
FIG. 7 is an image of a scene that includes a bright object captured at a reduced intensity, according to example embodiments.

Other techniques of determining the position of the bright object 602 within the captured image 502 are also possible. In some embodiments, for example, determining the location of the bright object 602 within the image may include capturing a baseline image of the scene at a reduced intensity to be used for comparison. Capturing a baseline image for comparison may be used in cases where the inherent luminance of the bright object 602 is unknown a priori and/or challenging to estimate. FIG. 7 illustrates one possible baseline image 702. The baseline image 702 may be captured at a substantially similar (e.g., the same) perspective relative to the scene (i.e., the surrounding environment of the optical detector system 400) as the captured image 502. For example, the baseline image 702 illustrated in FIG. 7 is captured at the same perspective relative to the scene as the captured image 502 illustrated in FIGS. 5 and 6.

Further, the baseline image 702 may be captured using a secondary optical detector system (e.g., a different camera than the camera used to capture the captured image 502). The secondary optical detector system may have a different dynamic range than the optical detector system 400 that captured the captured image 502. For example, the ISO sensitivity, exposure time, and/or aperture size of the secondary optical detector system may be different than the ISO sensitivity, exposure time, and/or aperture, respectively, of optical detector system 400. Additionally or alternatively, the secondary optical detector system may include an optical filter (e.g., a neutral-density (ND) filter) used to reduce the light intensity from the scene incident on an image sensor of the secondary optical detector system.

In other embodiments, rather than a secondary optical detector system being used to capture the baseline image 702, the optical detector system 400 used to capture the captured image 502 may be modified such that the optical detector system 400 can capture the baseline image 702. For example, the ISO sensitivity of the optical detector system 400 may be reduced, the aperture size of the optical detector system 400 may be reduced, the exposure time of the optical detector system 400 may be reduced, or an optical filter (e.g., an ND filter, a wavelength filter that filters out wavelengths that are emitted or reflected by the bright object 602, or a polarization filter that filters out polarizations that are emitted or reflected by the bright object 602) may be added to the optical detector system 400. Such modifications may alter the dynamic range of the optical detector system 400. Hence, after such modifications, the optical detector system may capture the baseline image 702 at a reduced intensity compared to the captured image 502.

Regardless of whether the same optical detector system 400 or a secondary optical detector system captures the baseline image 702, the baseline image 702 may be captured prior to, after, or substantially simultaneously with the capturing of the captured image 502, in various embodiments. Capturing the baseline image 702 temporally closely to when the captured image 502 is captured may ensure that the scene appears substantially the same between the two images such that a useful comparison between the baseline image 702 and the captured image 502 can be made to identify the location of the bright object 602 within the captured image 502. This may be of particular value when the bright object 602 is moving rapidly relative to the optical detector system 400 and/or the secondary optical detector system (e.g., when the optical detector system 400 and/or the secondary optical detector system are components of a vehicle in motion and the bright object 602 is a streetlight, traffic signal, taillight of another vehicle, or headlight of another vehicle).

In alternate embodiments, the images may be captured at disparate times but may nonetheless still be meaningfully compared to determine the location of the bright object 602 within the captured image 502. For example, the baseline image 702 may be captured precisely a year earlier than the captured image 502 such that the sun is in the same position in the sky. Alternatively, the baseline image 702 may be captured a day earlier or later than the captured image 502 and the baseline image 702 or the captured image 502 may be post-processed to account for daily differences in position along the solar analemma of the bright object 602 (e.g., when the object is the sun). In other embodiments (e.g., embodiments where the bright object 602 is non-cosmological), image processing may still be performed on the baseline image 702 and/or the captured image 502 such that the perspective relative to the scene/surrounding environment is the same for the two images. Performing image processing on the baseline image 702 and/or the captured image 502 may include scaling, adjusting the contrast, cropping, or rotating the respective image. Additionally or alternatively, image processing may be performed on the baseline image 702 and/or the captured image 502 to account for any differences between the optical detector systems used to capture the respective images. For example, if the optical detector system 400 used to capture the captured image 502 has a lens arrangement with a different zoom factor than a lens arrangement of a secondary optical detector system used to capture the baseline image 702, one or both of the images may be scaled to account for the differences in zoom factors.

As described above, the baseline image 702 may be used to identify the location of the bright object 602 within the captured image 502. Because the baseline image 702 may be captured at a reduced intensity (compared with the captured image 502), certain regions of the baseline image 702 (e.g., regions near the location of the bright object 602) might not be washed out (e.g., saturated) and/or might not be susceptible to generation of image artifacts. Hence, the contours/edges of the bright object 602 within the baseline image 702 may be more clearly defined than in the captured image 502. Thus, the size, shape, and position of the bright object 602 may be readily identified in the baseline image 702 (e.g., using an edge-detection algorithm executed by a processor). Then, based on the correspondence of positions within the baseline image 702 to positions within the captured image 502, the size, shape, and position of the bright object 602 within the captured image 502 may be determined.

There are multiple techniques by which the location of the bright object 602 within the captured image 502 may be determined, only a few of which have been described with reference to the previous figures. Once the location of the bright object 602 within the captured image 502 has been determined, the method of identifying whether one or more defects (e.g., optical imperfections) are present within the optical detector system (e.g., the optical detector system 400 illustrated in FIGS. 4A-4C) may include determining an extent of stray light from the bright object 602 within captured image 502.

Figure 8:
FIG. 8 is an image of a scene with an identified location of a bright object within the image and a region of stray light within the image, according to example embodiments.

FIG. 8 illustrates the captured image 502 as captured by an optical detector system (e.g., the optical detector system 400 illustrated in FIGS. 4A-4C). Also illustrated in FIG. 8 is the location of the bright object 602 within the captured image 502 as well as the region of stray light 802 surrounding the bright object 602 within the captured image 502. The region of stray light 802 (alternatively referred to as the primary region of stray light herein), as well as the bright object 602, may each have an intensity (e.g., pixel brightness value) greater than a threshold intensity value. Similar to the threshold luminance value used to define the bright object, the threshold intensity value may be predetermined and stored within a memory, defined based on the captured image 502, set/modified by a user, adjusted until a region of stray light 802 of a predefined size is identified, based on other factors (e.g., a weather forecast, such as when the forecast for a given region is cloudy or foggy and the bright object within the image is the sun, the moon, a traffic signal, a streetlight, etc.), and/or determined using a machine learning algorithm (e.g., by evaluating a set of labeled training data). Such a threshold intensity value may correspond to an expected extent of stray light from the bright object 602. The expected extent of stray light from the bright object 602 may be based on a baseline amount of stray light that would be present when imaging any object, may be based on the identity of the bright object, may be based on a time of day, may be based on a date, may be based on the present weather, and/or may be based on the location of the optical detector system (other factors upon which the expected extent of stray light are based are also possible). For example, the sun may have a greater corresponding expected extent of stray light than a taillight of a vehicle. The extent of stray light determined within the image may be compared to the expected extent of stray light to identify any aberrations (e.g., defects present within the optical detector system).

In some embodiments, determining the extent of stray light that is represented within the captured image 502 based on the bright object 602 (e.g., light produced by the bright object 602 and/or reflected by the bright object 602) may include identifying an existence of diffuse veiling glare within the image. As such, in some embodiments, the region of stray light 802 may correspond to diffuse veiling glare within the captured image 502. If diffuse veiling glare is identified within the captured image 502, this may provide an indication that dust or water (e.g., condensation) is present on an imaging optic (e.g., a lens or mirror) of the optical detector system 400 that captured the captured image 502. There are multiple methods by which the extent of stray light (e.g., the size and shape of the region of stray light 802 in FIG. 8) can be determined.

Figure 9:
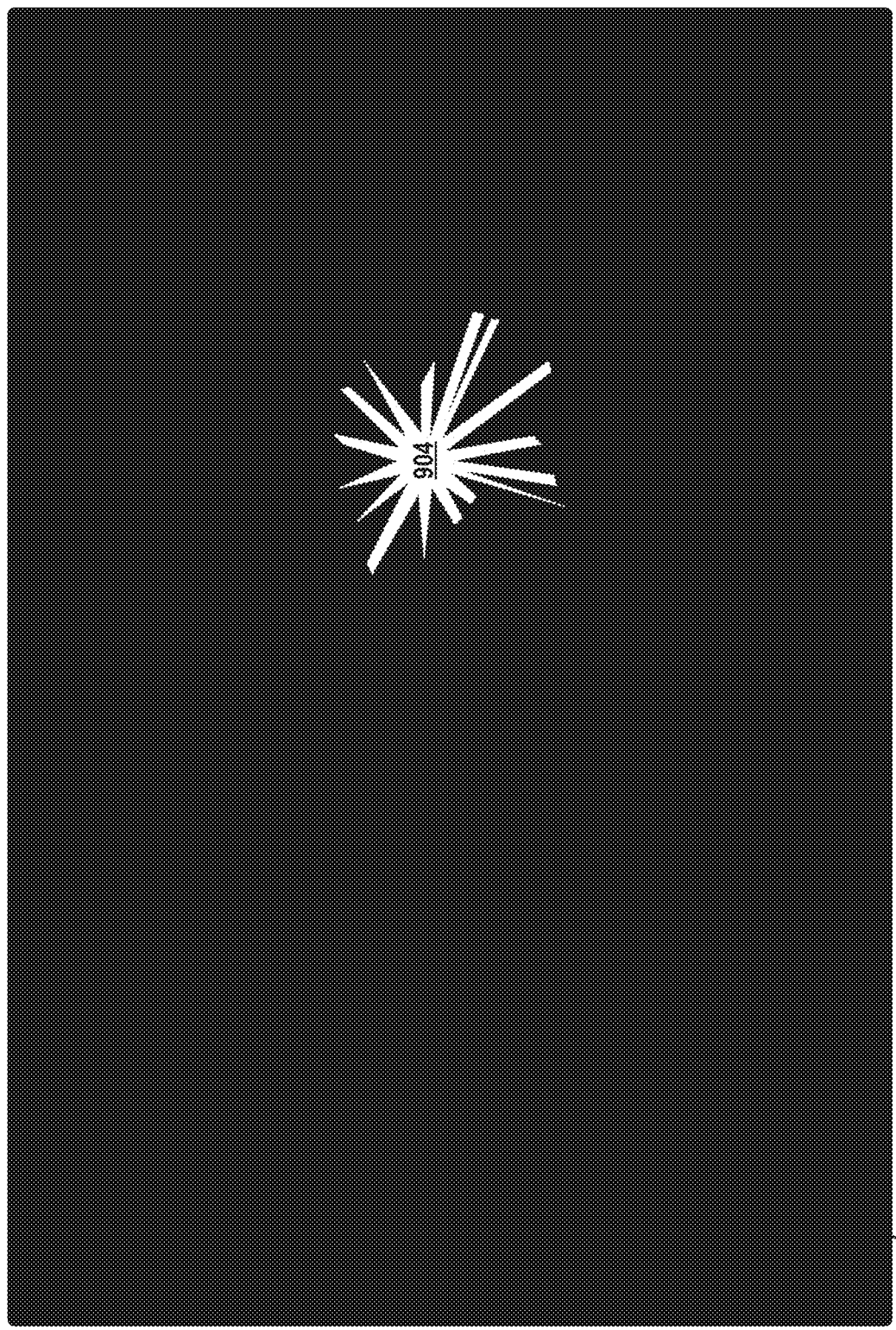
FIG. 9 is a derivative image of a scene, according to example embodiments.

One method for determining the extent of stray light from the bright object 602 that is represented within the captured image 502 includes identifying each pixel within the captured image 502 that has an intensity value above a predetermined threshold intensity value. Then, by converting all those pixels within the captured image 502 that have an intensity value greater than the predetermined threshold intensity value to white and all those pixels having an intensity value (e.g., brightness value) less than or equal to the predetermined threshold intensity value to black (or vice versa, i.e., converting all those pixels having an intensity value greater than the predetermined threshold intensity value to black and all those pixels having an intensity less than or equal to the predetermined threshold intensity value to white), a derivative image may be generated. FIG. 9 illustrates a possible embodiment of a derivative image 902. The derivative image 902 may include a high-intensity region 904 corresponding to those regions (e.g., those pixels) within the captured image 502 that have an intensity value greater than or equal to the predetermined threshold intensity value.

The predetermined threshold intensity value may be set in multiple different ways in various embodiments. In some embodiments, the predetermined threshold intensity value may be based on a rejection ratio relative to an inherent luminance of the bright object 602. For example, if the bright object 602 is the sun, the predetermined threshold intensity value may be based on the luminance of the sun (e.g., at a given time of day when the captured image 502 was captured by the optical detector system 400). Similarly, if the bright object 602 is a headlight of an oncoming vehicle, the predetermined threshold intensity value may be based on the luminance of the headlight. In some embodiments, the predetermined threshold intensity value may be based on a rejection ratio relative to the intensity (pixel brightness) of the regions of the captured image 502 where the bright object 602 is located. For example, the predetermined intensity value may be equal to $10^{-1}$, $10^{-2}$, $10^{-3}$, $10^{-4}$, $10^{-5}$, $10^{-6}$, $10^{-7}$, $10^{-8}$, $10^{-9}$, etc. times the relative intensity of the bright object 602 within the captured image 502. The rejection ratio, itself, may also be predetermined or may be determined based on the objects pictured within the captured image 502, other aspects of the environment surrounding the optical detector system 400 used to capture the captured image 502, and/or input from a user. Other ways of determining/setting the rejection ratio are also possible.

In embodiments where the predetermined threshold intensity value is based on a rejection ratio relative to the inherent luminance of the bright object 602, multiple ways of determining the inherent luminance of the bright object 602 may be used. For example, the inherent luminance of the bright object 602 may be available in published scientific data (e.g., the intensity of the sun at a given latitude with a given cloud cover at a given date may be available in a scientific journal article). Such data may then be stored within a data storage (e.g., data storage 114 as illustrated and described with reference to FIG. 1) that is accessible by a processor executing instructions to generate the derivative image 902. Alternatively, in some embodiments, the inherent intensity of the bright object 602 may be determined using an auxiliary sensor (e.g., a power meter) that is positioned near the optical detector system 400 and facing the bright object 602. Such an inherent intensity may be used as a baseline to determine the inherent luminance of the bright object 602.

In other embodiments, the predetermined threshold intensity value may be determined empirically for the optical detector system 400 based on the susceptibility of the optical detector system 400 to glare. The susceptibility of the optical detector system 400 to glare may be at least partially determined based on a veiling glare index measurement. A setup for measuring the veiling glare index of the optical detector system 400 (e.g., the veiling glare index of a lens arrangement of the optical detector system 400) is illustrated in FIG. 10A. As illustrated, an integrating sphere 1000 may be used to test the optical detector system 400 (e.g., to determine the veiling glare index of a lens arrangement of the optical detector system 400).

The integrating sphere 1000 may include one or more light sources 1002 and a light trap 1004. The interior surface of the integrating sphere 1000 may have a diffuse reflective coating such that light emitted by the light source(s) 1002 is transmitted to the optical detector system 400 as an approximately uniform, diffuse illumination over all input angles relative to the optical detector system 400. Further, the optical detector system 400 may be positioned relative to the integrating sphere 1000 such that, given the lens arrangement of the optical detector system 400, the light trap 1004 is located at a focal point relative to the image sensor 404.

In some embodiments of the optical detector system 400, however, the lens arrangement may be such that the focal point of the optical detector system 400 is nearly infinitely far away from a plane of the image sensor 404 (i.e., the optical detector system 400 may be focused to infinity). Hence, to simulate an infinite separation between the light trap 1004 and the image sensor 404, a collimating lens may be used. FIG. 10B illustrates the integrating sphere 1000 of FIG. 10A with a collimating lens 1010 inserted. However, the collimating lens 1010 itself may result in additional veiling glare/stray light effects that are independent of the stray light effects experienced by the optical detector system 400. Hence, the addition of the collimating lens 1010 into the experimental measurement of the veiling glare could result in additional veiling glare/stray light in calibration images captured by the image sensor 404 of the optical detector system 400 that would not otherwise be present in the absence of the collimating lens 1010. In some embodiments, effects of the collimating lens 1010 may be accounted for during calibration of the optical detector system 400 (e.g., by removing any veiling glare present in a calibration image using image processing or by adjusting the veiling glare index determined by the calibration process to mitigate any effects resulting from the collimating lens 1010). To determine what portions of the veiling glare/stray light within a calibration image might be caused by the collimating lens 1010, the collimating lens 1010 may be calibrated independently of the optical detector system 400 (e.g., using the integrating sphere 1000 and an image sensor in order to determine its veiling glare index).

In still other embodiments, other techniques for setting the predetermined threshold intensity value may be used. In some embodiments, the predetermined threshold intensity value may be set based on one or more settings within the optical detector system 400. For example, for a given aperture, exposure time, ISO sensitivity, and/or set of optical filter(s) used within the optical detector system 400, an associated predetermined threshold intensity value may be set. Alternatively, the threshold intensity value may be set based on a percentage of the intensity at which the image sensor 404 of the optical detector system 400 saturates (e.g., the threshold intensity value may be set to 50% of the saturation intensity). Other methods of determining the predetermined threshold intensity value are also possible.

Figure 11:
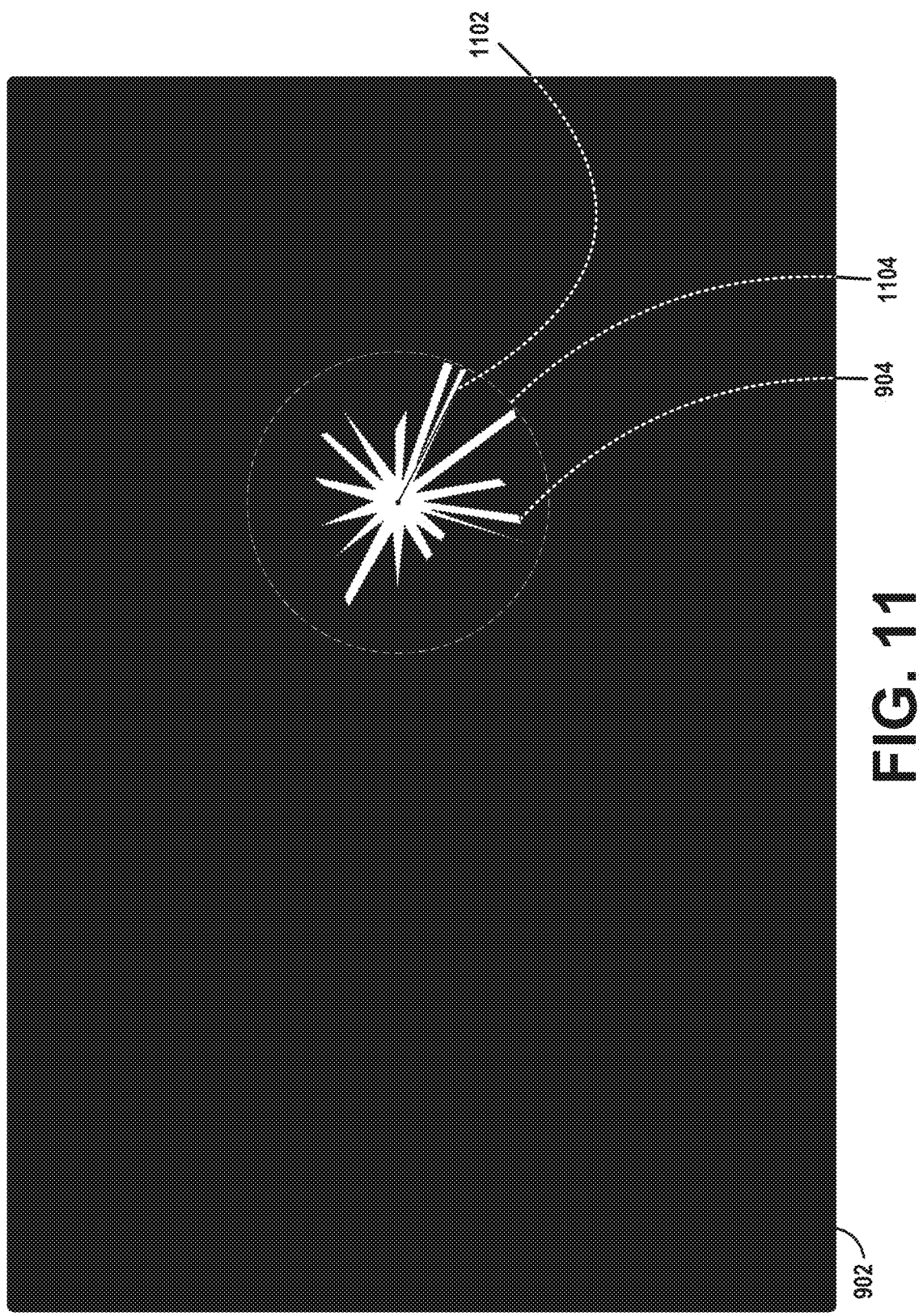
FIG. 11 is a derivative image of a scene with a maximum radius of contiguous white pixels relative to a center of the location of the bright object, according to example embodiments.

In some embodiments, after generating the derivative image 902, determining the extent of stray light from the bright object 602 that is represented in the captured image 502 may include determining a maximum radius of contiguous white pixels within the derivative image 902 relative to a center (illustrated in FIG. 11 by a black dot in the high-intensity region 904) of the location of the bright object 602 within the captured image 502. FIG. 11 illustrates the derivative image 902 corresponding to the captured image 502. Also illustrated in FIG. 11 is the maximum radius 1102 of contiguous white pixels relative to the center of the location of the bright object 602. A dashed circle 1104 having as its radius the maximum radius 1102 of contiguous white pixels is also illustrated in FIG. 11 for reference. As illustrated, one point along the dashed circle 1104 intersects the high-intensity region 904 (e.g., the point along the dashed circle 1104 that coincides with the maximum radius 1102 of the high-intensity region 904). In other embodiments (e.g., embodiments where the bright object 602 is depicted by black pixels in the derivative image 902 rather than white pixels), determining the extent of stray light from the bright object 602 may include determining a maximum radius 1102 of contiguous black pixels within the derivative image 902, instead. In some embodiments, once the maximum radius 1102 has been determined, this radius may represent the extent of stray light within the captured image 502. Alternatively, the radius of the bright object may be subtracted from the maximum radius 1102 to determine the extent of stray light within the captured image 502.

It is understood that the maximum radius 1102 is provided by way of example and that other maximum radii are also possible. For example, because the size of the high-intensity region 904 and, consequently, the maximum radius 1102 implicitly depend on the predetermined threshold intensity value used to generate the derivative image 902, if the predetermined threshold intensity value were selected differently, the maximum radius 1102 may be greater or smaller than illustrated. Further, in some embodiments, alternate methods of evaluating the size of the high-intensity region 904 and/or evaluating the extent of stray light within the captured image 502 by generating/evaluating the derivative image 902 may be used.

In addition, once the extent of stray light within the captured image 502 has been determined (e.g., by determining the maximum radius 1102 of contiguous white pixels in the derivative image 902), the presence (or absence) of one or more defects (e.g., optical imperfections) within the optical detector system 400 used to capture the captured image 502 may be identified. Determining whether one or more defects are present within the optical detector system 400 may include comparing the extent of stray light from the bright object 602 that is represented in the captured image 502 to a predetermined threshold extent of stray light.

Comparing the extent of stray light from the bright object 602 that is represented in the captured image 502 to a predetermined threshold extent of stray light may be performed in a variety of ways. For example, in some embodiments, the length of the maximum radius 1102 of the high-intensity region 904 in the derivative image 902 may be compared to a threshold radius length (e.g., that is predetermined and stored within a memory, defined based on the captured image 502, and/or set/modified by a user). If it is determined that the length of the maximum radius 1102 is greater than the threshold radius length, it may be determined that one or more defects are present within the optical detector system 400. Further, a difference between the length of the maximum radius 1102 and the threshold radius length and/or a ratio of the length of the maximum radius 1102 to the threshold radius length may be used to identify the number and/or types of defects present within the optical detector system 400. If, however, it is determined that the length of the maximum radius 1102 is less than or equal to the threshold radius length, it may be determined that no defects are present within the optical detector system 400.

Additionally or alternatively, other methods of comparing the extent of stray light from the bright object 602 that is represented in the captured image 502 to a predetermined threshold extent of stray light may be performed to identify one or more defects within the optical detector system 400. In some embodiments, for example, the total area occupied by the high-intensity region 904 within the derivative image 902 may be compared to a threshold area. Similar to the length of the maximum radius 1102, if it is determined that the total area occupied by the high-intensity region 904 is greater than the threshold area, it may be determined that one or more defects are present within the optical detector system 400. Further, a difference between the total area occupied by the high-intensity region 904 and the threshold area and/or a ratio of the total area occupied by the high-intensity region 904 to the threshold area may be used to identify the number and/or types of defects present within the optical detector system 400. If, however, it is determined that the total area occupied by the high-intensity region 904 is less than or equal to the threshold area, it may be determined that no defects are present within the optical detector system 400.

Figure 12:
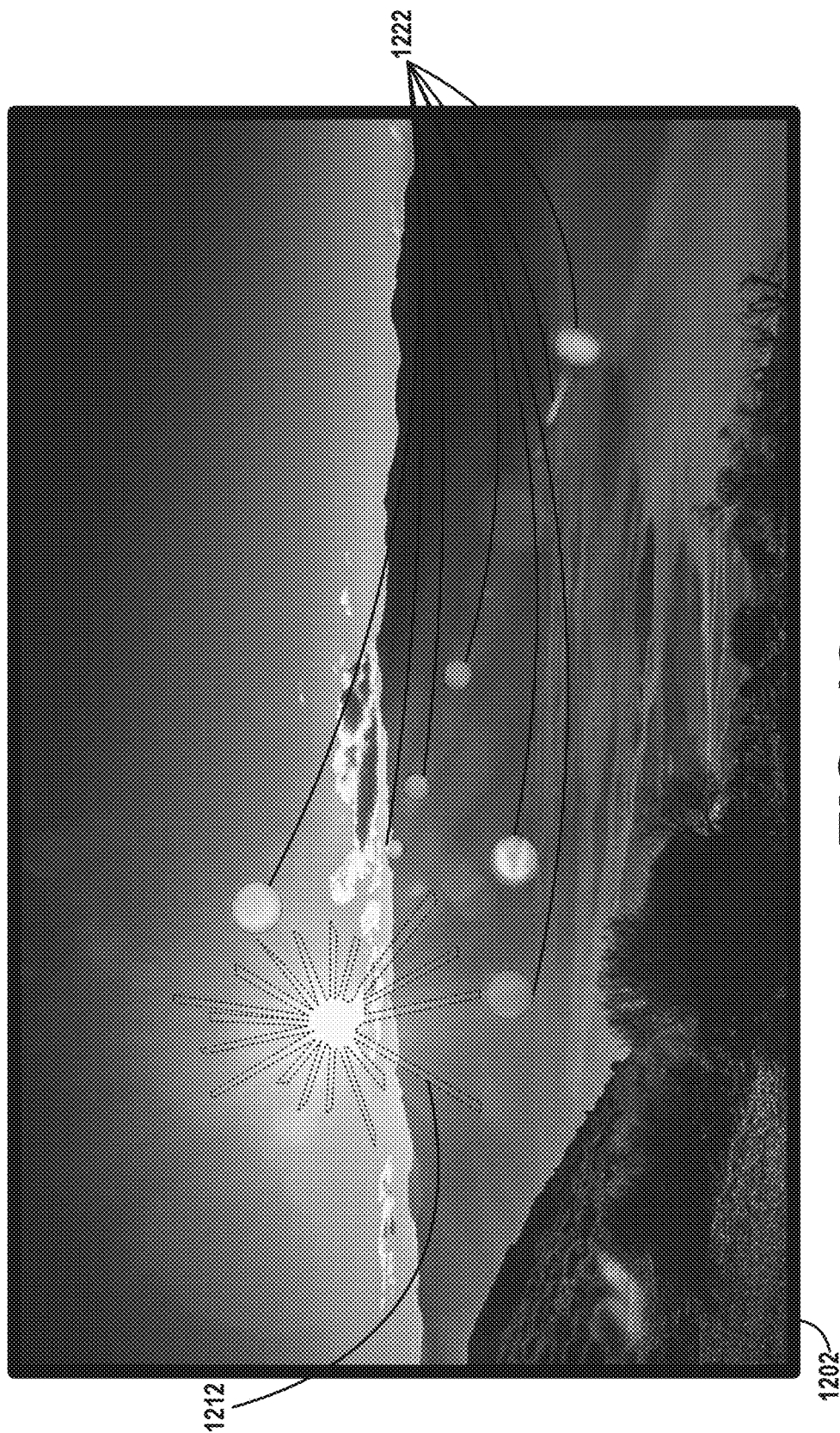
FIG. 12 is an image of a scene with a primary region of stray light within the image and secondary regions of stray light within the image, according to example embodiments.

Another method of determining the extent of stray light from a bright object that is represented in the captured image with glare may include identifying one or more secondary regions of stray light that are separated from the bright object within the captured image with glare. An embodiment having one or more secondary regions of stray light separated from the bright object within the captured image with glare is illustrated in FIG. 12. FIG. 12 includes a captured image with glare 1202 (e.g., captured by the optical detector system 400 described with reference to FIGS. 4A-4C), a region of stray light 1212 (e.g., that surrounds a bright object, which happens to be the sun in the captured image with glare 1202 of FIG. 12), and multiple secondary regions 1222 of stray light. Both the region of stray light 1212 that surrounds the bright object and the secondary regions 1222 are regions having an intensity value (e.g., pixel brightness)

greater than a threshold intensity value. Similar to the threshold intensity value described above with respect to the region of stray light 802 surrounding the bright object 602 illustrated in FIG. 8, the intensity value that serves as a demarcation between the region of stray light 1212/the secondary regions 1222 and the rest of the captured image with glare 1202 may be determined based on a variety of factors.

In some embodiments, there may be separate threshold intensity values (e.g., one for the region of stray light 1212 that surrounds the bright object, and one for secondary regions 1222 separated from the high-intensity region). The presence of stray light that is separated from the bright object by one or more pixels within the captured image with glare 1202 may still correspond to the presence of defects within the optical detector system 400 even if the intensity of the stray light that is separated from the bright object by one or more pixels has a lower intensity than the bright object/region of stray light 1212. Because of this, a different threshold intensity value (e.g., a secondary threshold intensity value that is less than the threshold intensity value used to define the region of stray light 1212) may be used to identify secondary regions 1222 of stray light within the captured image with glare 1202. In other embodiments, secondary regions 1222 may be less relevant to the identification of defects in the optical detector system 400, so a greater threshold value is used to identify the secondary regions 1222 than is used to identify the region of stray light 1212. As with the intensity value used to identify the region of stray light 1212, any secondary threshold intensity value used to identify the secondary regions 1222 may be determined based on a variety of factors. Additionally, in some embodiments, the secondary threshold intensity value may be a multiple (e.g., a multiple greater than or less than one) of the intensity value used to identify the region of stray light 1212. Such a multiplication factor may be predefined and stored within a memory, defined based on the captured image with glare 1202, and/or set/modified by a user.

Figure 13:
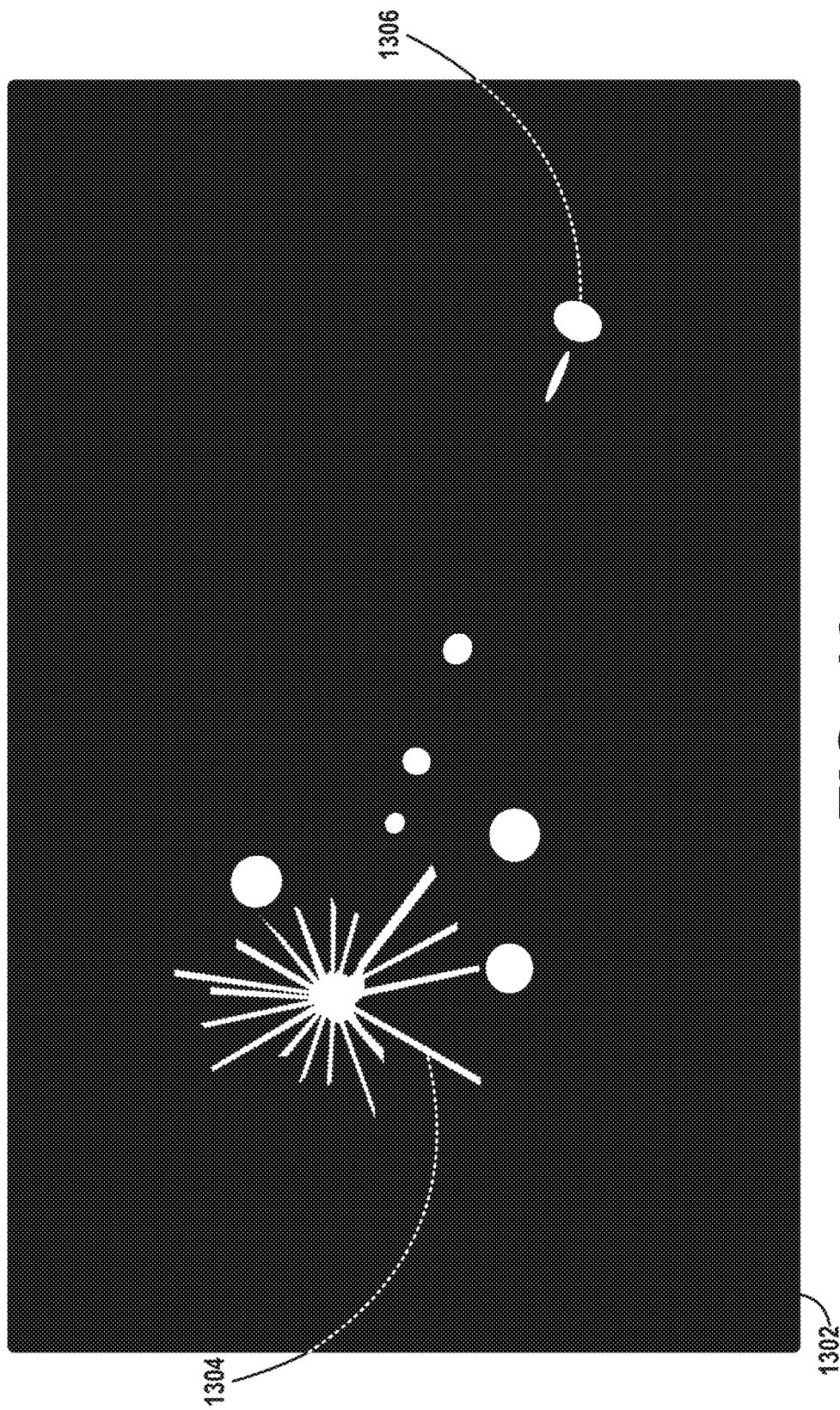
FIG. 13 is a derivative image of a scene with a primary region of stray light within the image and secondary regions of stray light within the derivative image that are separated by one or more black pixels from the primary region of stray light, according to example embodiments.

In various embodiments, various methods of identifying secondary regions 1222 within the captured image with glare 1202 may be used. For example, similar to generating the derivative image 902 illustrated in FIG. 9, a derivative image 1302 may be generated, as illustrated in FIG. 13. Like the derivative image 902 of FIG. 9, the derivative image 1302 of FIG. 13 may be generated by identifying each pixel within the captured image with glare 1202 that has an intensity value above a predetermined threshold intensity value and converting all those pixels having an intensity value greater than the predetermined threshold intensity value to white and all those pixels having an intensity value less than or equal to the predetermined threshold intensity value to black. This may result in the derivative image 1302 having a high-intensity region 1304 near the location of a bright object and secondary regions 1306 (e.g., separated from the high-intensity region 1304 by one or more black pixels). The high-intensity region 1304 near the bright object and secondary regions 1306 may be used to identify corresponding regions within the captured image with glare 1202, for example.

Upon identifying secondary regions 1222 within the captured image with glare 1202 (e.g., by generating a derivative image 1302 using the process described above), such secondary regions 1222 may be used to determine the extent of stray light from the bright object that is represented in the captured image with glare 1202. For example, the number of secondary regions 1222 within the captured image with glare 1202 may indicate the extent of stray light from the bright object that is represented in the captured image with glare 1202 (e.g., and, ultimately, may represent one or more defects and/or the types of the one or more defects within the optical detector system 400 used to capture the captured image with glare 1202). For example, the number of secondary regions 1222 within the captured image with glare 1202 may be compared to a threshold number of secondary regions to determine the extent of the stray light. Additionally or alternatively, the separation (e.g., pixels or other measure of distance) between each of the secondary regions 1222 and the region of stray light 1212 may correspond to the extent of stray light from the bright object that is represented in the captured image with glare 1202. The separation between a given secondary region 1222 and the region of stray light 1212 may be measured as a distance (e.g., a number of pixels) between (i) the edge of the secondary region 1222 nearest to the region of stray light 1212 and (ii) the nearest portion of the region of stray light 1212 or between (i) an identified center of the respective secondary region 1222 and (ii) the center of the region of stray light 1212 or the center of the bright object within the captured image with glare 1202. Further, the separation between the given secondary region 1222 and the region of stray light 1212 may be compared to a threshold separation to determine the extent of the stray light.

In addition, in various embodiments, various metrics regarding the aggregate separation between multiple secondary regions 1222 and the region of stray light 1212 may be used to determine the extent of stray light from the bright object that is represented in the captured image with glare 1202. For example, the sum of the separations between each respective secondary region 1222 and the region of stray light 1212 may be used. Alternatively, the average of the separations between each respective secondary region 1222 and the region of stray light 1212 may be used. In still other embodiments, the median separation between each respective secondary region 1222 and the region of stray light 1212 may be used. Other metrics regarding the separations between each of the secondary regions 1222 and the region of stray light 1212 are also possible. Still further, the aggregate separation metric between multiple secondary regions 1222 and the region of stray light 1212 that is used may be compared to a threshold aggregate separation to determine the extent of the stray light.

Regardless of how the extent of stray light from the bright object 602 that is represented in the captured image 502 is compared to the predetermined threshold extent of stray light (either by using the derivative image 902 as a comparison tool or by performing some other comparison), identifying one or more defects within the optical detector system 400 may include determining what types of defects are present within the optical detector system 400 (e.g., determining whether an imaging optic within the optical detector system 400, such as a lens, mirror or optical window, is unclean or occluded by debris). Further, upon identifying the presence of one or more defects (and, possibly, the types of the defect(s)) within the optical detector system 400, corrective action may be taken (e.g., by the optical detector system 400; a service technician; a control system, such as the control system 106 illustrated in FIG. 1; or a server computing device configured to monitor states of multiple optical detector systems in a fleet of optical detector systems). In various embodiments, corrective action may include cleaning, repairing, recalibrating, replacing, or decommissioning the optical detector system 400. For example, if the optical detector system 400 is used for object detection and avoidance on a vehicle (e.g., the vehicle 100 illustrated and described with reference to FIGS. 1-3), the optical detector system 400 may be replaced with a new optical detector system that does not suffer the same defects or the optical detector system 400 and/or the entire vehicle 100 may be decommissioned until the defects can be corrected. Additionally or alternatively, corrective action may include transmitting or otherwise outputting an alert (e.g., via a message to a mobile computing device of a user, to a server computing device, on a user display, and/or over a speaker associated with the optical detector system 400, etc.).

In some embodiments, after performing the corrective action, another image may be captured by the optical detector system 400 and analyzed using the methods described herein to determine the extent of stray light present within the additional image. If the additional image has the same extent or a greater extent of stray light than the original image captured, it may be determined that the originally identified type of defect was incorrect (e.g., if dust was originally identified based on the extent of stray light in the originally captured image, a crack may now be determined to actually be the defect in the optical detector system 400 based on the additional image). Additionally or alternatively, if it is determined that the identified defect is still present, more drastic corrective measures could be taken (e.g., decommissioning the optical detector system 400 or replacing a lens of the optical detector system 400 rather than simply wiping a lens of the optical detector system 400 using a windshield wiper). Oppositely, if the additional image has a lesser extent of stray light than the original image captured (e.g., an extent of stray light lower than a threshold extent of stray light that indicates a defect), it may be determined that the defect is no longer present within the optical detector system 400 after the corrective action was taken.

Figure 14A:
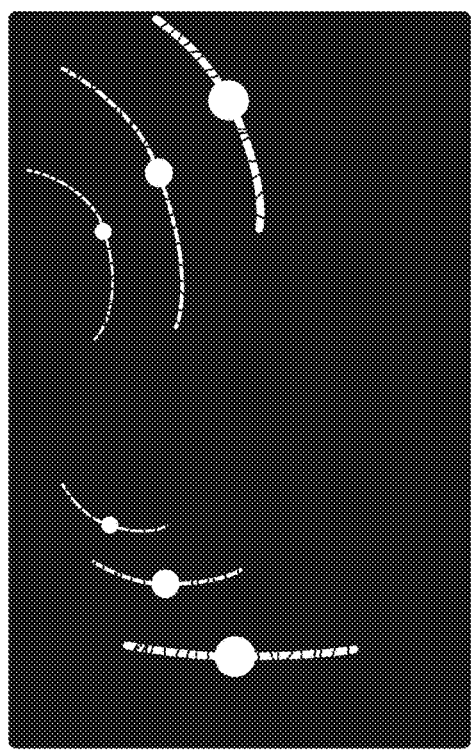
FIG. 14A is a derivative image that includes stripes of stray light, according to example embodiments.

As described above, in some embodiments, the type of any defect present within the optical detector system 400 may be determinable based on a captured image with glare. In some embodiments, the presence of water (e.g., condensation), dust, or dirt on an imaging optic of an optical detector system 400 may be identified based on a pattern of a region of stray light and/or patterns of secondary regions of stray light within the captured image with glare. For example, if the optical detector system 400 that captured the image with glare has a lens that uses a wiper (e.g., a windshield wiper) to clean a lens, mirror, or optical window, patterns left by the motion of such a wiper (e.g., patterns such as streaks or stripes identifiable within the captured image with glare) can be used to identify dust, dirt, or water present on an imaging optic of the optical detector system 400. FIG. 14A illustrates a derivative image (e.g., generated in a similar fashion to the derivative image 902 of FIG. 9 or the derivative image 1302 of FIG. 13) that reflects the presence of streaks or stripes generated by a wiper on an imaging optic. Hence, based on the derivative image, it may be determined that dust, dirt, or water is present on an imaging optic of the optical detector system 400.

Figure 14B:
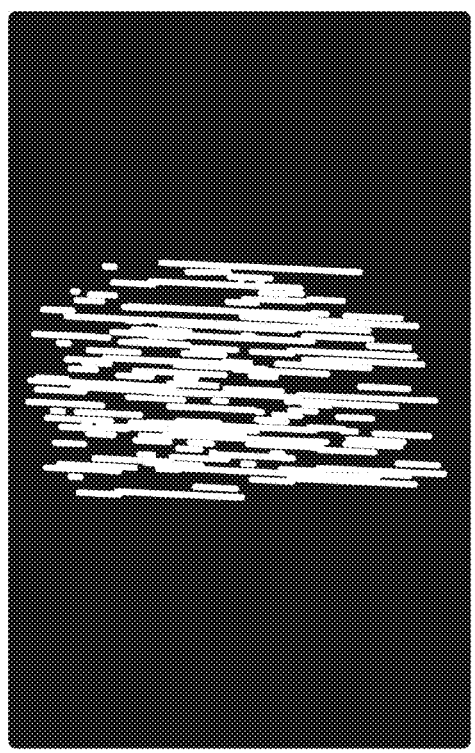
FIG. 14B is a derivative image that includes stripes of stray light, according to example embodiments.

Additionally or alternatively, the presence of water on an imaging optic of the optical detector system 400 may be detected as a result of water moving in streams across the imaging optic. For example, trickling water may leave a distinct striped pattern (e.g., different than the striped pattern illustrated in FIG. 14A) across the imaging optic that would result in streaks or stripes of stray light within a captured image with glare captured by the optical detector system 400. FIG. 14B illustrates a derivative image (e.g., generated in a similar fashion to the derivative image 902 of FIG. 9 or the derivative image 1302 of FIG. 13) that includes streaks or stripes of stray light that may be the result of water dripping across one of the imaging optics of the corresponding optical detector system 400. Hence, based on the derivative image in FIG. 14B, the extent of stray light from the bright object that is represented in the captured image with glare may be determined such that the presence of water on an imaging optic of the optical detector system 400 is identified.

In some embodiments, the number of stripes within an image (e.g., within a derivative image) may be used to distinguish between streaks that arise based on a windshield wiper (e.g., as in FIG. 14A) or based on dripping/running water (e.g., as in FIG. 14B). Distinguishing between the number of stripes within an image or otherwise identifying stray light patterns within an image may include applying a machine-learning algorithm that is trained to perform object recognition in images. Such a machine-learning algorithm may have been previously trained using labeled training data that was produced by recording images with glare using the optical detector system 400 with intentionally applied defects (e.g., scratches, cracks, misalignments, debris, etc.). While FIGS. 14A and 14B depict derivative images in which streaks or stripes of stray light may be identified, it is understood that such streaks or stripes of stray light may alternatively be readily identified in the captured image with glare (e.g., without generating a derivative image), or with different types of derivative images.

As described above, the extent of stray light from the bright object that is represented in the image (e.g., the captured image with glare and/or the derivative image generated based on the captured image with glare) can be used to determine the presence and/or type of one or more defects (e.g., optical imperfections) associated with an optical detector system. Instead of or in addition to using such stray light representations in images, other factors can be considered when attempting to identify one or more defects or the type of one or more defects associated with an optical detector system. For example, if the optical detector system is located on a moving vehicle, but the optical detector system is facing backwards while the vehicle is traveling forwards, it may be unlikely that bugs or other debris strike a lens of the optical detector system. Hence, such a factor could be considered by a processor executing instructions (e.g., a controller of the optical detector system) attempting to identify what type of defect is giving rise to a given extent of stray light within the captured image with glare. Oppositely, if the optical detector system is facing forwards while the vehicle is traveling forwards, it may be more likely that bugs or other debris strike the lens of the optical detector system. Likewise, such a factor could be considered when attempting to identify what type of defect is giving rise to a given extent of stray light within the captured image with glare.

In order to monitor a state of the optical detector system (e.g., to ensure that the optical detector system is capturing images that accurately represent an environment surrounding the optical detector system), the process of capturing an image, identifying any potential stray light within the image based on bright objects, determining the extent of the stray light, and then identifying any defects based on the extent of the stray light may be repeated at regular (e.g., periodic) intervals. The period at which the optical detector system is monitored may be based on a predetermined monitoring frequency (e.g., as used by a controller to perform the monitoring routine). The predetermined monitoring frequency may be based on the components of the optical detector system (e.g., the age or model of the one or more components of the optical detector system), the age of the optical detector system, the frequency with which the optical detector system is used to capture images, a setting programmed/transmitted by a user, previous defects identified to be present within the optical detector system, previous captured images with glare and/or derivative images associated with the optical detector system, the time of day, the weather in an area of the optical detector system (e.g., if there is snow, rain, or fog near the optical detector system, the predetermined monitoring frequency might be higher), etc.

In other embodiments, the process of capturing an image, identifying any potential stray light within the image based on bright objects, determining the extent of the stray light, and then identifying any defects based on the extent of the stray light may be performed in response to a request from a computing device. For example, the computing device may be a user computing device (e.g., a mobile computing device or a tablet computing device) executing an application (i.e., an app) used to monitor a state of the optical detector system. In other embodiments, the computing device may be a server computing device configured to monitor states of multiple optical detector systems in a fleet of optical detector systems. For instance, in some embodiments the server computing device may manage a fleet of vehicles each operating in an autonomous mode. In order to ensure each of the vehicles is functioning properly, the server computing device may transmit (e.g., at regular intervals) status requests to each of the vehicles to ensure that the optical detector system(s) of the respective vehicle are in working order (e.g., free from defects) and, if one of the optical detector systems is not in working order, the server computing device can take corrective action (e.g., dispatch a service technician to repair the optical detector system).

In some embodiments, when the server computing device transmits a status request to an optical detector system, the optical detector system may perform the analysis for defects and report the result to the server computing device (e.g., including in the report any images captured during the determination of the presence or absence of defects). In other embodiments, after receiving a status request, the optical detector system may capture an image of the surrounding environment (e.g., including a bright object) and then transmit the captured image to the server computing device for analysis. The server computing device may evaluate the extent of stray light in the captured image received to identify any defects in the optical detector system (e.g., as described above). In some embodiments, the images captured by optical detector system may be stored in a memory of the server computing device (e.g., for later analysis and/or to track the degradation of the optical detector system over time).

Figure 15:
FIG. 15 is an illustration of a scene that includes a bright object, according to example embodiments.

FIG. 15 illustrates a captured image 1502 with glare captured by an optical detector system (e.g., the optical detector system 400 illustrated in FIGS. 4A-4C). As described above, the glare within a captured image 1502 can correspond to a number of different bright objects within a scene (e.g., the sun, the moon, a retroreflective object, a traffic signal, a taillight of a vehicle, a headlight of a vehicle, etc.). As illustrated in FIG. 15 (e.g., based on the number of objects resulting in stray light within the captured image 1502), the bright objects within a captured image 1502 can also correspond to streetlights, flood lights underneath a bridge, or reflections off of a water surface. In still other embodiments, the bright objects may correspond to a diagnostic light source that is a component within the optical detector system used to identify possible defects within the optical detector system. For example, the optical detector system may include an auxiliary, high-intensity light source that shines directly into a lens of the optical detector system from a predetermined position with a predetermined intensity and/or luminance. Based on a captured image, the predetermined position, and the predetermined intensity/luminance, the presence of one or more defects within the optical detector system may be identified.

Also as illustrated in FIG. 15, in some captured images 1502 there may be multiple bright objects within a single captured image. In such cases, the captured image 1502 can be evaluated in a variety of ways to determine the extent of glare within the captured image 1502 based on the bright objects. In some embodiments, the captured image 1502 could be cropped into multiple smaller images (e.g., each containing a single bright object), each of which could be individually evaluated using the techniques described herein, and then the results could be aggregated to describe the extent of stray light across the entire captured image 1502. In other embodiments, the techniques described herein could be adapted to accommodate multiple locations of bright objects within the captured image 1502 (and, possible, multiple secondary regions relative to each of the bright objects). Additionally or alternatively, to distinguish between regions that actually contain additional bright objects within the captured image 1502 and regions that contain secondary regions of glare (stemming from another bright object within the scene), multiple tiers of threshold intensity levels may be used (e.g., analogous to the multiple threshold intensity levels described above). For example, a first threshold intensity level could be used such that any pixel having an intensity level greater than the first threshold intensity level is classified as a bright object or a region of stray light surrounding one of the bright objects; a second threshold intensity level could be used such that any pixel having an intensity value less than or equal to the first threshold intensity level and greater than the second threshold intensity level is classified as a secondary region that, while of sufficient intensity to correspond to stray light/glare, does not represent a bright object or a region of stray light surrounding one of the bright objects; and any pixel having an intensity value less than or equal to the second threshold intensity level is classified as a pixel that corresponds neither to a bright object/surrounding region nor to a secondary region of stray light.

III. EXAMPLE PROCESSES

Figure 16:
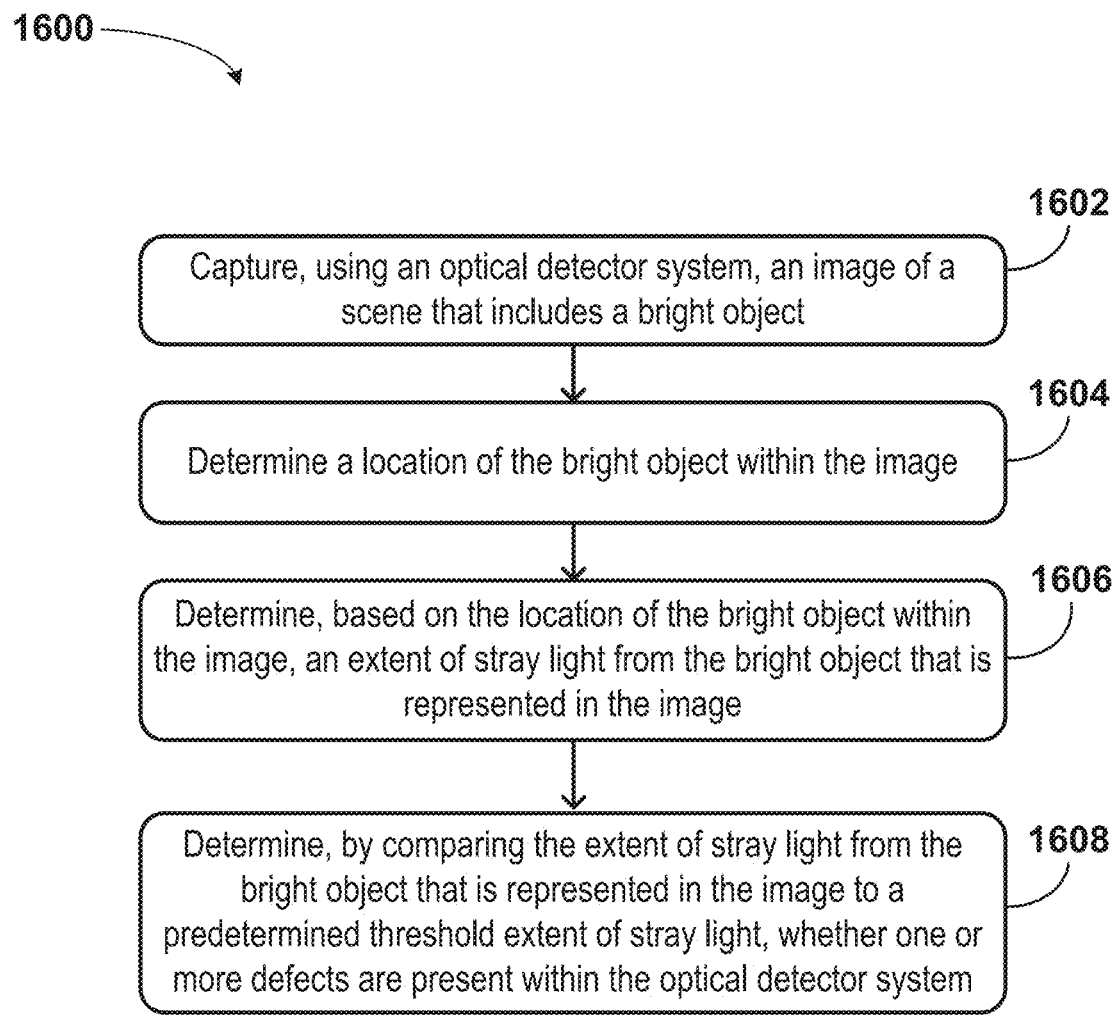
FIG. 16 is an illustration of a method, according to example embodiments.

FIG. 16 is a flowchart diagram of a method 1600, according to example embodiments. One or more blocks of the method 1600 may be performed by the computer system 112 illustrated in FIG. 1, in various embodiments. In some embodiments, one or more of the blocks of the method 1600 may be performed by a computing device (e.g., a controller of one or more components of the optical detector system 400). The computing device may include computing components such as a non-volatile memory (e.g., a hard drive or a read-only memory (ROM)), a volatile memory (e.g., a random-access memory (RAM), such as dynamic random-access memory (DRAM) or static random-access memory (SRAM)), a user-input device (e.g., a mouse or a keyboard), a display (e.g., an LED display or a liquid-crystal display (LCD)), and/or a network communication controller (e.g., a WIFI® controller, based on IEEE 802.11 standards, or an Ethernet controller). The computing device, for example, may execute instructions stored on a non-transitory, computer-readable medium (e.g., a hard drive) to perform one or more of the operations contemplated herein.

At block 1602, the method 1600 may include capturing, using an optical detector system, an image of a scene that includes a bright object.

At block 1604, the method 1600 may include determining a location of the bright object within the image.

At block 1606, the method 1600 may include determining, based on the location of the bright object within the image, an extent of stray light from the bright object that is represented in the image.

At block 1608, the method 1600 may include determining, by comparing the extent of stray light from the bright object that is represented in the image to a predetermined threshold extent of stray light, whether one or more defects are present within the optical detector system.

In some embodiments of the method 1600, the bright object in the image may be the sun.

In some embodiments of the method 1600, the location of the bright object within the image may be determined based on a geographical location of the optical detector system, an orientation of the optical detector system, a time of day, or a calendar date. Further, the extent of stray light from the bright object that is represented in the image may also be determined based on a predetermined angular size of the sun when observed from Earth.

In some embodiments, the method 1600 may include cleaning, repairing, recalibrating, replacing, or decommissioning the optical detector system in response to determining that one or more defects are present within the optical detector system.

In some embodiments of the method 1600, determining whether one or more defects are present within the optical detector system may include determining whether an imaging optic within the optical detector system is unclean or occluded by debris. For example, based on the extent of stray light within the image and/or the position of the stray light within the image, the position and/or type of debris or uncleanliness within the optical detector system may be identified. In some embodiments, for example, a low-intensity glare spread across the entity of the image may indicate an unclean imaging optic, whereas a high-intensity glare located in a small portion of the image may indicate debris or damage to an imaging optic at that position of the image. Further, in some embodiments, determining whether the imaging optic within the optical detector system is unclean or occluded by debris may include determining whether: the optical detector system is facing backwards on a vehicle traveling forwards (e.g., using a "drive" gear); the optical detector system is facing forwards on a vehicle traveling forwards (e.g., using a "drive" gear); the optical detector system is facing backwards on a vehicle traveling backwards (e.g., using a "reverse" gear); or the optical detector system is facing forwards on a vehicle traveling backwards (e.g., using a "reverse" gear).

In some embodiments of the method 1600, block 1606 may include identifying each pixel within the image that has an intensity value above a predetermined threshold intensity value. Block 1606 may also include generating a derivative image by converting all those pixels having an intensity value greater than the predetermined threshold intensity value to white and all those pixels having an intensity value less than or equal to the predetermined threshold intensity value to black.

Further, in some embodiments of the method 1600, block 1606 may include determining a maximum radius of contiguous white pixels within the derivative image relative to a center of the location of the bright object.

In addition, in some embodiments of the method 1600, block 1606 may include identifying a secondary region of stray light that is separated by one or more black pixels from a primary region of stray light within the derivative image.

Still further, in some embodiments of the method 1600, the predetermined threshold intensity value may be based on a rejection ratio relative to an inherent luminance level of the bright object.

In some embodiments of the method 1600, block 1606 may include identifying one or more stripes of stray light within the image. Further, block 1608 may include identifying, based on the one or more stripes of stray light within the image, that streaks of water or debris are present on an imaging optic of the optical detector system as a result of motion of a windshield wiper across the imaging optic.

In some embodiments of the method 1600, block 1606 may include identifying an existence of diffuse veiling glare within the image. Further, block 1608 may include identifying, based on the diffuse veiling glare within the image, that dust or water is present on an imaging optic of the optical detector system.

In some embodiments of the method 1600, block 1604 may include capturing a baseline image of the scene at a reduced intensity. The baseline image may be captured at a substantially similar perspective relative to the scene as the image. Further, the baseline image may be captured using a secondary optical detector system that has a different dynamic range than the optical detector system or using the optical detector system with a modified dynamic range.

Further, in some embodiments, the bright object in the image may be the moon, a retroreflective object, a traffic signal, a taillight of a vehicle, a headlight of a vehicle, or a street light.

In some embodiments, the method 1600 may be repeated at regular intervals to monitor a state of the optical detector system.

IV. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

The computer-readable medium can also include non-transitory computer-readable media such as computer-readable media that store data for short periods of time like register memory and processor cache. The computer-readable media can further include non-transitory computer-readable media that store program code and/or data for longer periods of time. Thus, the computer-readable media may include secondary or persistent long term storage, like ROM, optical or magnetic disks, solid state drives, compact-disc read only memory (CD-ROM), for example. The computer-readable media can also be any other volatile or non-volatile storage systems. A computer-readable medium can be considered a computer-readable storage medium, for example, or a tangible storage device.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
    capturing, using a camera, a first image of a scene that includes a bright object;
    determining a location of the bright object within the first image;
    determining, based on the location of the bright object within the first image, a first extent of diffuse veiling glare or lens flare from the bright object that is represented in the first image;
    determining, by comparing the first extent of diffuse veiling glare or lens flare from the bright object that is represented in the first image to a predetermined threshold extent of stray light, whether one or more optical imperfections are present on an imaging optic of the camera,
    wherein the predetermined threshold extent of stray light corresponds to an expected extent of stray light;
    upon determining that one or more optical imperfections are present on the imaging optic of the camera, performing a corrective action;
    after performing the corrective action, capturing, using the camera, a second image of the scene;
    determining a second extent of diffuse veiling glare or lens flare represented in the second image; and
    comparing the second extent of diffuse veiling glare to the first extent of diffuse veiling glare to determine whether the one or more optical imperfections are still present on the imaging optic of the camera.

2. The method of claim 1, wherein the location of the bright object within the first image is determined based on a geographical location of the camera.

3. The method of claim 1, wherein the one or more optical imperfections present on the imaging optic of the camera comprise condensation present on the imaging optic of the camera, and wherein the corrective action comprises wiping the imaging optic of the camera using a windshield wiper.

4. The method of claim 1, wherein the corrective action comprises performing image analysis to alter images captured by the camera to mitigate errors caused by the one or more optical imperfections.

5. The method of claim 1, wherein the one or more optical imperfections comprise an impurity in the imaging optic of the camera, a crack in the imaging optic of the camera, an air bubble in the imaging optic of the camera, a scratch on the imaging optic of the camera, dirt on the imaging optic of the camera, dust on the imaging optic of the camera, a bug splatter on the imaging optic of the camera, a degradation of a lens coating of the imaging optic of the camera, condensation on the imaging optic of the camera, debris on the imaging optic of the camera, imperfect transparency of the imaging optic of the camera, or warping of the imaging optic of the camera.

6. The method of claim 1, wherein the first extent of diffuse veiling glare or lens flare from the bright object that is represented in the first image is also determined based on a predetermined angular size of the sun when observed from Earth.

7. The method of claim 1, wherein taking corrective action comprises cleaning, repairing, or recalibrating.

8. The method of claim 1, wherein determining whether one or more optical imperfections are present on the imaging optic of the camera comprises determining whether the imaging optic of the camera is unclean or occluded by debris.

9. The method of claim 8, wherein determining whether the imaging optic within the camera is unclean or occluded by debris comprises determining whether:
    the camera is facing backwards on a vehicle traveling forwards;
    the camera is facing forwards on a vehicle traveling forwards;

the camera is facing backwards on a vehicle traveling backwards; or the camera is facing forwards on a vehicle traveling backwards.

10. The method of claim 1, wherein determining the first extent of diffuse veiling glare or lens flare from the bright object that is represented in the first image comprises:

identifying each pixel within the first image that has an intensity value above a predetermined threshold intensity value; and generating a derivative image by converting all those pixels having an intensity value greater than the predetermined threshold intensity value to white and all those pixels having an intensity value less than or equal to the predetermined threshold intensity value to black.

11. The method of claim 10, wherein determining the first extent of diffuse veiling glare or lens flare from the bright object that is represented in the first image further comprises determining a maximum radius of contiguous white pixels within the derivative image relative to a center of the location of the bright object.

12. The method of claim 10, wherein determining the first extent of diffuse veiling glare or lens flare from the bright object that is represented in the first image further comprises identifying a secondary region of stray light that is separated by one or more black pixels from a primary region of stray light within the derivative image.

13. The method of claim 10, wherein the predetermined threshold intensity value is based on a rejection ratio relative to an inherent luminance level of the bright object.

14. The method of claim 1, wherein determining the first extent of diffuse veiling glare or lens flare from the bright object that is represented in the first image comprises identifying one or more streaks or stripes of stray light within the first image, and wherein determining whether one or more optical imperfections are present on the imaging optic of the camera comprises identifying, based on the one or more streaks or stripes of stray light within the first image, that streaks of water or debris are present on the imaging optic of the camera as a result of motion of a windshield wiper across the imaging optic.

15. The method of claim 1, wherein determining the first extent of diffuse veiling glare or lens flare from the bright object that is represented in the first image comprises identifying an existence of diffuse veiling glare within the first image, and wherein determining whether one or more optical imperfections are present on the imaging optic of the camera comprises identifying, based on the diffuse veiling glare within the first image, that dust or water is present on the imaging optic of the camera.

16. The method of claim 1, wherein determining the location of the bright object within the first image comprises capturing a baseline image of the scene at a reduced intensity, wherein the baseline image is captured at a substantially similar perspective relative to the scene as the first image, and wherein the baseline image is captured using a secondary camera that has a different dynamic range than the camera or using the camera with a modified dynamic range.

17. A non-transitory, computer-readable medium having instructions stored thereon, wherein the instructions, when executed by a processor, cause the processor to execute a method comprising:

receiving a first image of a scene that includes a bright object, wherein the first image was captured using a camera;

determining a location of the bright object within the first image;

determining, based on the location of the bright object within the first image, a first extent of diffuse veiling glare or lens flare from the bright object that is represented in the first image;

determining, by comparing the first extent of diffuse veiling glare or lens flare from the bright object that is represented in the first image to a predetermined threshold extent of stray light, whether one or more optical imperfections are present on an imaging optic of the camera, wherein the predetermined threshold extent of stray light corresponds to an expected extent of stray light;

upon determining that one or more optical imperfections are present on the imaging optic of the camera, causing a corrective action to be performed;

after performing the corrective action, receiving a second image of the scene, wherein the second image was captured using the camera;

determining a second extent of diffuse veiling glare or lens flare represented in the second image; and comparing the second extent of diffuse veiling glare to the first extent of diffuse veiling glare to determine whether the one or more optical imperfections are still present on the imaging optic of the camera.

18. A camera comprising:

an imaging optic;

an image sensor configured to receive light from a scene via the imaging optic; and a controller configured to perform a monitoring routine, wherein the monitoring routine comprises:

capturing, using the camera, a first image of a scene that includes a bright object;

determining a location of the bright object within the first image;

determining, based on the location of the bright object within the first image, a first extent of diffuse veiling glare or lens flare from the bright object that is represented in the first image;

determining, by comparing the first extent of diffuse veiling glare or lens flare from the bright object that is represented in the first image to a predetermined threshold extent of stray light, whether one or more optical imperfections are present on an imaging optic of the camera, wherein the predetermined threshold extent of stray light corresponds to an expected extent of stray light;

upon determining that one or more optical imperfections are present on the imaging optic of the camera, causing a corrective action to be performed;

after performing the corrective action, capturing, using the camera, a second image of the scene;

determining a second extent of diffuse veiling glare or lens flare represented in the second image; and comparing the second extent of diffuse veiling glare to the first extent of diffuse veiling glare to determine whether the one or more optical imperfections are still present on the imaging optic of the camera.

19. The camera of claim 18, wherein the controller is configured to perform the monitoring routine in response to a request from a computing device.

20. The camera of claim 19, wherein the computing device is a server computing device configured to monitor states of multiple optical detector systems in a fleet of optical detector systems.

* * * * *